US012565802B2

(12) United States Patent
Rudd et al.

(10) Patent No.: US 12,565,802 B2
(45) Date of Patent: Mar. 3, 2026

(54) WINDOW ACTUATOR LINKAGE ASSEMBLY FOR ALIGNMENT ADJUSTMENT AT A MOVEABLE PORTION OF A WINDOW

(71) Applicants: ABT Systems, LLC, Annville, PA (US); TM Rudd Consulting, LLC, Lacona, NY (US); Elizabeth Galvin, Washington, DC (US)

(72) Inventors: Armin F. Rudd, Annville, PA (US); Timothy M. Rudd, Lacona, NY (US)

( * ) Notice: Subject to any disclaimer, the term of this patent is extended or adjusted under 35 U.S.C. 154(b) by 86 days.

(21) Appl. No.: 18/129,480

(22) Filed: Mar. 31, 2023

(65) Prior Publication Data

US 2024/0328228 A1 Oct. 3, 2024

(51) Int. Cl.
*E05F 15/619* (2015.01)

(52) U.S. Cl.
CPC ......... *E05F 15/619* (2015.01); *E05Y 2201/43* (2013.01); *E05Y 2201/656* (2013.01); *E05Y 2600/12* (2013.01); *E05Y 2600/14* (2013.01); *E05Y 2600/31* (2013.01); *E05Y 2600/46* (2013.01); *E05Y 2600/51* (2013.01); *E05Y 2600/61* (2013.01); *E05Y 2600/626* (2013.01); *E05Y 2900/148* (2013.01)

(58) Field of Classification Search
CPC ......... E05F 15/619; E05F 15/12; E05F 11/06; E05F 11/04
USPC ................................................ 16/50, 54, 57
See application file for complete search history.

(56) References Cited

U.S. PATENT DOCUMENTS 4,945,678 A 8/1990 Berner et al.
5,406,750 A 4/1995 Lindgren
8,250,846 B2 8/2012 Soerensen
8,982,441 B2 3/2015 Schlam et al.
11,447,945 B2 9/2022 Harnish et al.
11,479,188 B2 * 10/2022 Jang .................... H01B 7/0045
11,725,446 B2 * 8/2023 Bernhagen ........... E05F 15/627
49/279

(Continued)

FOREIGN PATENT DOCUMENTS

DE 202010000269 U1 * 2/2010
EP 1264955 A2 12/2002

(Continued)

OTHER PUBLICATIONS

DE202010000269U1 English translation from Espacenet (Year: 2010).*

*Primary Examiner* — Muhammad Ijaz
*Assistant Examiner* — Susan M. Heschel
(74) *Attorney, Agent, or Firm* — Covington & Burling LLP; Jay I. Alexander

(57) ABSTRACT

A window actuator linkage assembly that includes barrel brackets, a mounting bracket, and a clamping plate for fastening to a moveable portion of a window that facilitates adjustment of the alignment of a chain extending from an actuator positioned on or within a fixed portion of a window to the window actuator linkage assembly. A window actuator linkage assembly can also include elements such as barrel brackets that have openings to receive a fastener, a T-shaped base, and a slotted base bracket having an inner surface that slidably engages with the T-shaped base, and is configured to fix the T-shaped base in a desired position along the length of the slotted base bracket.

16 Claims, 31 Drawing Sheets

(56) References Cited

U.S. PATENT DOCUMENTS

| | | | | |
|---|---|---|---|---|
| 11,905,751 | B2 * | 2/2024 | Rudd | E05F 15/616 |
| 12,139,954 | B2 * | 11/2024 | Curtis | E05F 15/71 |
| 2009/0083939 | A1 * | 4/2009 | Wu | E05F 5/10<br>16/85 |
| 2018/0014895 | A1 | 1/2018 | Zhao et al. | |
| 2022/0314482 | A1 | 10/2022 | Hernandez | |
| 2024/0301742 | A1 * | 9/2024 | Gyawali | E05F 11/06 |

FOREIGN PATENT DOCUMENTS

| | | | |
|---|---|---|---|
| EP | 1813757 | A1 | 8/2007 |
| EP | 1747386 | B1 | 12/2007 |

* cited by examiner

WINDOW ACTUATOR LINKAGE ASSEMBLY FOR ALIGNMENT ADJUSTMENT AT A MOVEABLE PORTION OF A WINDOW

FIELD OF THE INVENTION

Embodiments of the present invention relate to a window actuator linkage assembly having barrel brackets, a mounting bracket, and a clamping plate and, more particularly, to a window actuator linkage assembly on a moveable portion of the window that facilitates adjustment of the alignment of a chain extending from a fixed portion of the window to the moveable portion of the window.

BACKGROUND

As referred to in this document, a window is an opening constructed in a wall, door, or roof for the purpose of admitting light or air to a space within a building enclosure and is framed and spanned with glass mounted to permit opening and closing.

Windows in buildings can be installed with motorized actuators for convenience of opening and closing the moveable portion of the window, without having physical human contact with the window. The actuator can be mounted on an exposed fixed surface of a window frame or mounted unexposed and recessed into the fixed frame part of the window. The actuator utilizes a conventional push-pull chain or similar chain (hereinafter "chain" or "actuator chain"), such as described in U.S. Pat. No. 8,250,846, that can bend in one direction only and thus allows the chain to push a load, and to thus open and close the moveable portion of the window. U.S. Pat. No. 8,250,846 is incorporated herein by reference in its entirety.

One end of the chain is connected to a window chain linkage on the moveable portion of the window, and the other end of the chain is connected to an actuator chain linkage of the actuator. The chain is driven by an actuator motor, which causes the chain to extend from the actuator and retract into the actuator, to thereby respectively open and close the window.

Difficulties can arise in obtaining proper mounting alignment between the actuator chain linkage—when the actuator is either mounted on or recessed into the fixed portion of the window—and the window chain linkage, particularly when the actuator is mounted unexposed and recessed into the fixed frame part of a window. Even relatively small misalignments between the ends of the chain proximate the actuator chain linkage and the window chain linkage can cause binding of the actuator chain such that moveable portion of the window may not close properly.

Misalignments can be caused by conditions such as imprecise surface mounting of the actuator, imprecise machining of the concealed recess within the window frame, slightly out of square moveable portions of the window, slightly out of plumb or level window frame installation, and/or window component movement caused by thermal expansion and contraction. The relatively small tolerances required for proper operation make issues caused by slight misalignment common.

When the moveable portion of the window does not close properly and contact the window seals, water, air and noise intrusion can occur, and security can be compromised. Attempts to resolve misalignment between the actuator chain linkage and the window chain linkage, such as by remounting the actuator or attempting in-place machining of the actuator linkage on the moveable portion of the window, can be time consuming and costly, and may not effectively correct the misalignment.

Misalignment between the window chain linkage and the actuator chain linkage can be further complicated when, for example, large windows utilize multiple actuators. Under such circumstances, one actuator may not pull the window closed fully while the other actuator does, thereby causing a potentially dangerous out-of-plane bending force to be applied to the moveable portion of the window that could potentially cause the glass to break, especially in the presence of thermal stresses due to indoor to outdoor temperature differences.

SUMMARY OF EMBODIMENTS OF THE INVENTION

In a first embodiment, an actuator linkage assembly is provided for mounting on a moveable portion of a window. The assembly includes a first barrel bracket that has a first opening, a second barrel bracket that has a second opening, such that the first and second barrel brackets are capable of being arranged to have a window chain linkage having a third opening positioned between the first and second barrel brackets so that the first, the second and the third openings are in substantial axial alignment to receive a fastener for insertion into the first, second and third openings. The first barrel bracket comprises a first hole and the second barrel bracket comprises a second hole to respectively receive a first fastener and a second fastener.

In addition, a mounting bracket includes a first surface, a second surface and a third surface, such that the first and second surfaces have a first slot and a second slot, and the second and third surfaces form a channel, such that at least a portion of the first barrel bracket and at least a portion of the second barrel bracket contact at least a portion of the first surface of the mounting bracket. The first and second barrel brackets respectively include first and second extended portions that respectively fit into and slidingly engage along the first and second slots, and the first and second extended portions respectively include a first hole and a second hole to respectively receive the first fastener and the second fastener.

A clamping plate is positioned within the channel and is in contact with the second surface of the mounting bracket. The clamping plate has a first hole and a second hole capable of respectively receiving the first fastener and the second fastener, such that the first barrel bracket is capable of being positioned along the first slot and secured in place by tightening the first fastener, and the second barrel bracket is capable of being positioned along the second slot and secured in place by tightening the second fastener, such that positioning the first and second barrel brackets allows an actuator chain to be aligned along its length, from a fixed part of the window to the window chain linkage.

The respective first holes of the first barrel bracket, the first extended portion, and the clamping plate, and the first slot of the bracket can be positioned in substantial alignment to receive the first fastener, and the respective second holes of the second barrel bracket, the second extended portion, and the clamping plate, and the second slot of the bracket can be positioned in substantial alignment to receive the second fastener.

The first and second holes of the clamping plate are threaded. In addition, the first and second barrel brackets are capable of being secured in position when the first and second fasteners are tightened. The first and second slots can be oblong.

The bracket can include a first hole configured to receive the first fastener and a second hole configured to receive the second fastener, for mounting the actuator linkage assembly to the moveable portion of the window. The actuator linkage assembly is capable of being configured to facilitate rotation of the moveable portion of the window, from a first position to a second position. In addition, the actuator linkage assembly is capable of being further configured to facilitate opening and closing the moveable portion of the window. The fastener can be a pin.

The first and second oblong slots can be positioned equidistant from a midpoint of the bracket. In addition, the actuator linkage assembly is capable of being configured to have a motor of an actuator facilitate extending and retracting the actuator chain to cause rotation of the moveable portion of the window, from a first position to a second position. The first fastener and the second fastener can be a bolt.

In a second embodiment, an actuator linkage assembly is provided for mounting on a moveable portion of a window. The assembly includes a first barrel bracket that has a first opening, a second barrel bracket that has a second opening, such that the first and second barrel brackets are capable of being arranged to have a window chain linkage having a third opening positioned between the first and second barrel brackets so that the first, the second and the third openings are in substantial axial alignment to receive a fastener for insertion into the first, second and third openings. In addition, a mounting bracket includes a first surface, a second surface and a third surface, such that the first and second surfaces have a first slot and a second slot, and the second and third surfaces form a channel, such that at least a portion of the first barrel bracket and at least a portion of the second barrel bracket contact at least a portion of the first surface of the mounting bracket.

A clamping plate is positioned within the channel and is in contact with the second surface of the mounting bracket. The clamping plate has a first hole that is configured to receive a first fastener that is inserted through a hole of the first barrel bracket and the first slot, and a second hole that is configured to receive a second fastener inserted through a hole of the second barrel bracket and the second slot, such that the first barrel bracket is capable of being positioned along the first slot and the second barrel bracket is capable of being positioned along the second slot, and positioning the first and second barrel brackets allows an actuator chain to be aligned along its length, from a fixed part of the window to the window chain linkage.

The first and second barrel brackets can include an extended portion that respectively fits into the first and second slots, which can be oblong slots. The first and second barrel brackets are capable of being secured in position when the first and second fasteners are tightened.

The bracket can include a first hole that is configured to receive the first fastener and a second hole configured to receive the second fastener, for mounting the assembly to the moveable portion of the window. The first fastener can be a screw, and the second fastener can also be a screw.

The assembly is capable of being configured to facilitate rotation of the moveable portion of the window, from a first position to a second position, and doing so without binding the actuator chain. The assembly is also capable of being further configured to facilitate opening and closing the moveable portion of the window, and doing so without binding the actuator chain.

The fastener for insertion into the first, second and third openings can be a pin, and the first and second oblong slots can be positioned equidistant from a midpoint of the bracket. The assembly is also capable of being configured to have a motor of an actuator facilitate extending and retracting the actuator chain that is secured to the window chain linkage, to cause rotation of the moveable portion of the window, from a first position to a second position.

The actuator chain linkage assembly is further capable of being configured to be driven by an actuator motor of an actuator mounted on or within the fixed portion of the window, which causes the actuator chain to extend from the actuator and retract into the actuator, to thereby rotate the moveable portion of the window, from a first position to a second position.

In a third embodiment, a method for making an actuator linkage assembly is provided such that the assembly can be mounted on a moveable portion of a window and in a manner that is suitable for use to align a chain of an actuator along a length of the chain between a fixed part of a window and a moveable portion of the window. The method includes providing for use on the moveable portion of the window a first barrel bracket that includes a first opening and providing for use on the moveable portion of the window a second barrel bracket that includes a second opening, wherein said first and second barrel brackets are capable of being arranged to have a window chain linkage that has a third opening and that is connected to the chain and that is positioned between the first and second barrel brackets. The first, second and third openings are capable of receiving a fastener for insertion into the first, second and third openings.

The method also includes providing a mounting bracket that has a first surface and a second surface that respectively have a first slot and a second slot, wherein at least a portion of the first barrel bracket and at least a portion of the second barrel bracket are capable of being positioned to contact at least a portion of the first surface. The method further includes providing a clamping plate capable of being positioned within a channel of the mounting bracket and in contact with the second surface. The clamping plate is provided with a first hole that is configured to receive a first fastener inserted through a hole of the first barrel bracket and the first slot, and a second hole that is configured to receive a second fastener inserted through a hole of the second barrel bracket and the second slot, so that the chain is capable of being maintained in alignment along its length, from the fixed part of the window to the window chain linkage, upon mounting the bracket to the moveable portion of the window and securing the first barrel bracket along the first slot and securing the second barrel bracket along the second slot by respectively tightening the first and second fasteners. The first and second holes of the clamping plate can be threaded.

The method can also include providing on the first and second barrel brackets an extended portion that respectively fits into the first and second slots, each of which can be oblong and positioned equidistant from a midpoint of the bracket. The method can also include providing the mounting bracket with a first hole configured to receive a first fastener and a second hole configured to receive a second fastener, for mounting the assembly to the moveable portion of the window.

In addition, the assembly can be provided with the capability of being configured to facilitate rotation of the moveable portion of the window, from a first position to a second position, and doing so without binding the actuator chain. The first and second positions can correspond to the window respectively being in an opened position and being in a closed position, and being rotated to opened and closed positions without binding the actuator chain.

The method can further include providing a pin as the fastener for insertion into the first, second and third openings. The method can also include providing the assembly with the capability of being configured to have a motor facilitate extending and retracting the actuator chain to cause rotation of the moveable portion of the window, from a first position to a second position. The first and second positions can correspond to the window respectively being in an opened position and being in a closed position, and being rotated to opened and closed positions without binding the actuator chain. A first screw can be provided as the first fastener, and a second screw can be provided as the second fastener.

The method can also include providing the assembly with the capability of being configured to be driven by a motor of an actuator mounted on or within the fixed portion of the window, which causes the actuator chain to extend from the actuator and retract into the actuator, to thereby rotate the moveable portion of the window, from a first position to a second position. The method can further include providing the mounting bracket with a first hole configured to receive a first fastener and a second hole configured to receive a second fastener for mounting the assembly to the moveable portion of the window In a fourth embodiment, a method is provided for connecting an actuator chain that extends from a fixed part of a window to a moveable portion of the window. The method includes providing for use on the moveable portion of the window a first barrel bracket that has a first opening, and also providing for use on the moveable portion of the window a second barrel bracket that has a second opening.

The first and second barrel brackets are capable of being arranged to have a window chain linkage, connected to the chain and having a third opening, capable of being positioned between the first and second barrel brackets, wherein the first, second and third openings are capable of receiving a fastener for insertion into the first, second and third openings. The method also includes providing a bracket that has a first surface and a second surface, such that the first and second surfaces respectively include a first slot and a second slot, wherein at least a portion of the first barrel bracket and at least a portion of the second barrel bracket are capable of being positioned to contact at least a portion of the first surface, whereby positioning the first and second barrel brackets allows an actuator chain to be aligned along its length, from the fixed part of the window to the window chain linkage.

The method further includes providing a clamping plate that is capable of being positioned within a channel of the mounting bracket and that is in contact with the second surface. In addition, the clamping plate includes a first hole that is configured to receive a first fastener inserted through a hole of the first barrel bracket and the first slot, and a second hole that is configured to receive a second fastener inserted through a hole of the second barrel bracket and the second slot, wherein the first barrel bracket is capable of being secured along the first slot and the second barrel bracket is capable of being secured along the second slot, by respectively tightening the first and second fasteners.

The method also includes providing the chain with the capability of being maintained in alignment along its length, from the fixed part of the window to the window chain linkage, upon securing the first barrel bracket along the first slot and securing the second barrel bracket along the second slot by respectively tightening the first and second fasteners. In addition, the method includes providing on the first and second barrel brackets an extended portion that respectively fits into the first and second slots, each of which can be oblong.

The method further includes providing the mounting bracket with a first hole configured to receive a first fastener and a second hole configured to receive a second fastener, for mounting the bracket to the moveable portion of the window. A first screw can be provided as the first fastener and a second screw can be provided as the second fastener. The first and second brackets can be provided with the capability of being configured to facilitate rotation of the moveable portion of the window, from a first position to a second position, and doing so without binding the actuator chain.

In addition, the assembly can be provided with the capability of being configured to facilitate opening and closing the moveable portion of the window, and doing so without binding the actuator chain. The provided fastener can be a pin, and the first and second oblong slots can be positioned equidistant from a midpoint of the bracket.

The method also includes providing the actuator chain linkage assembly with the capability of being configured to be driven by an actuator motor of an actuator mounted on or within the fixed portion of the window, to cause the actuator chain to extend from the actuator and retract into the actuator, to thereby rotate the moveable portion of the window, from a first position to a second position.

The method can also include providing the assembly with the capability of being configured to have a motor facilitate extending and retracting the actuator chain to cause rotation of the moveable portion of the window, from a first position to a second position. In addition, the provided first and second barrel brackets can be capable of being secured in position along the bracket when the first and second fasteners are tightened. The first and second holes of the clamping plate can be threaded.

In a fifth embodiment, a window actuator linkage assembly for mounting on a moveable portion of a window is provided. The assembly includes an elongate mounting member having a first barrel bracket and a second barrel bracket separated from the first barrel bracket by an opening along a length of the elongate mounting member, and a base portion having i) a bottom surface portion, ii) a first side surface portion extending substantially perpendicular from the bottom surface portion, iii) a first return surface extending substantially perpendicular from the first side surface portion, iv) a first shoulder extending substantially perpendicular from the first return surface, v) a second side surface portion extending substantially perpendicular from the bottom surface portion and substantially parallel to the first side surface portion, vi) a second return surface extending substantially perpendicular from the second side surface, and vii) a second shoulder extending substantially perpendicular from the second return surface and substantially parallel to the first shoulder, wherein a width of the bottom surface portion defined by the first and second side surface portions is greater than a width of the first and second barrel brackets.

The assembly also includes an elongate base bracket, formed separately from and configured to be secured to the elongate mounting member, having i) an inner surface and an outer surface, ii) a first wall extending substantially perpendicularly from and along a first edge of the inner surface, terminating at a first wall edge distal from the first edge of the inner surface, iii) a second wall projecting substantially perpendicularly from and along a second edge of the inner surface and substantially parallel to the first wall, terminating at a second wall edge distal from the second edge of the inner surface, iv) a first return portion extending from the first wall edge and substantially towards the second wall, and v) a second return portion extending from the second wall edge and substantially towards the first wall, such that the first side surface portion is configured to be slidably positioned along the first wall and the first return surface is configured to be slidably positioned along the first return portion, and such that the second side surface portion is configured to be slidably positioned along the second wall and the second return surface is configured to be slidably positioned along the second return portion.

The base portion includes at least one hole, which can be configured to receive a screw to fasten barrel brackets in a desired position along the length of the elongate base bracket. The base portion can also include at least two holes, each of which can be configured to respectively receive a screw to fasten the first and second barrel brackets in a desired position along the length of the elongated base bracket. In addition, the elongate base bracket can include at least two screw holes, each of which can be configured to respectively receive a screw to fasten the elongate base bracket to the moveable portion of the window.

In addition, the opening along the length of the elongate mounting member is configured to receive a window chain linkage of an actuator. The window chain linkage includes a third opening, such that the first, second and third openings are capable of receiving a fastener for insertion into the first, second and third openings.

DETAILED DESCRIPTION OF EMBODIMENTS

Figure 1:
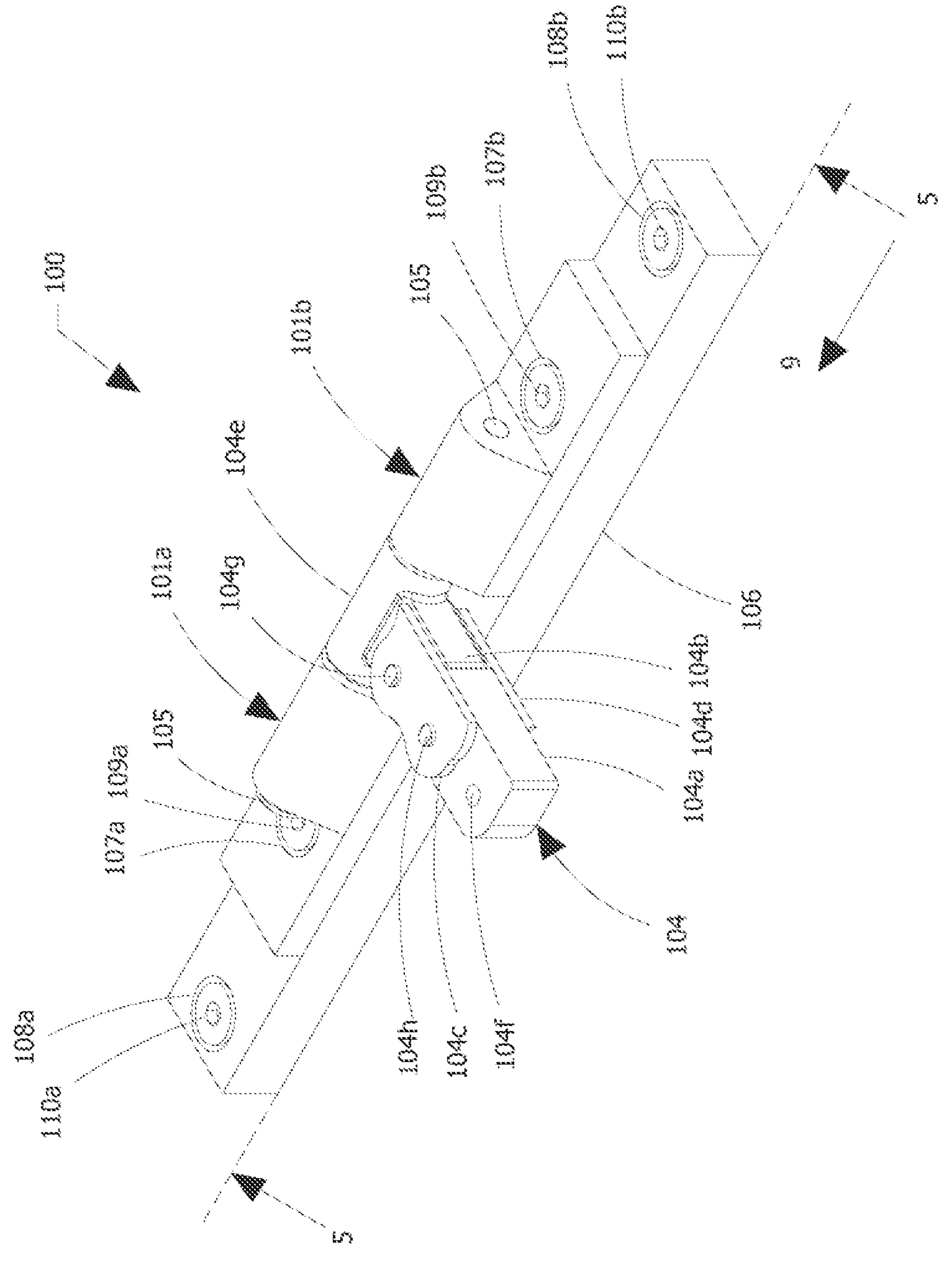
FIG. 1 is an isometric top view of a first embodiment of a linkage assembly.
Figure 11:
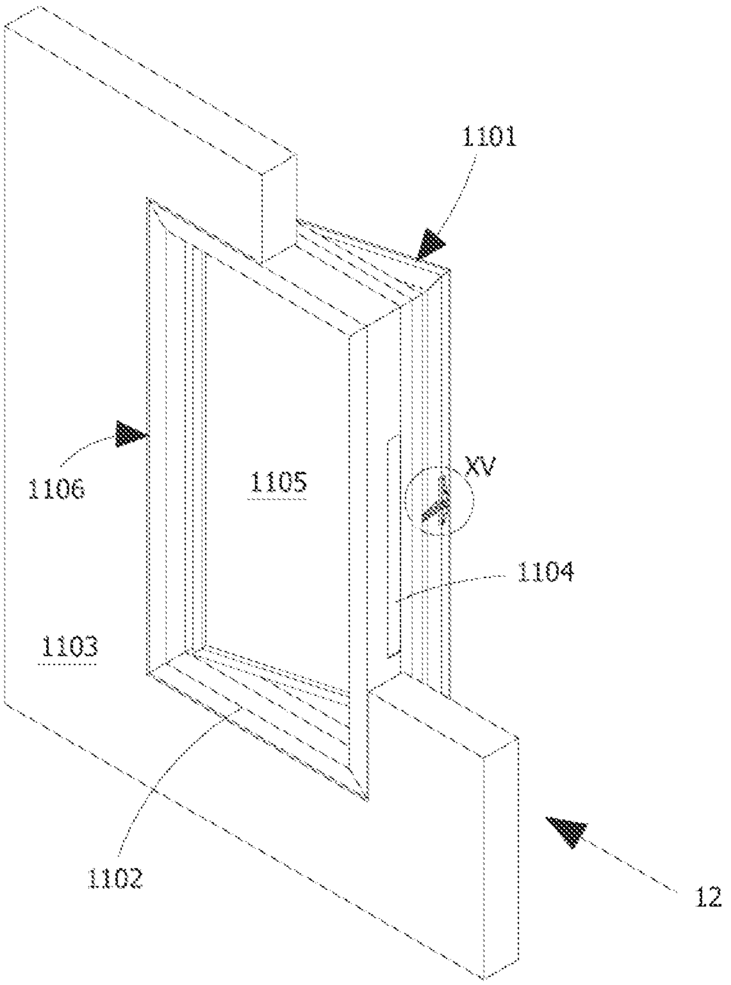
FIG. 11 is an isometric view of an assembly of an interior side of a window in a section of wall.

FIG. 1 is an isometric top view of a first embodiment of an actuator linkage assembly 100 used to connect an actuator chain 104 from a window actuator 1104 (shown in FIG. 11) to a movable portion 1101 of a window 1106 (shown in FIG. 11). Generally, the actuator linkage assembly 100 includes elements such as a barrel brackets 101*a*, 101*b*, a bracket 106 having a channel 111 between two legs 112*a*, 112*b* (shown in FIGS. 2B and 2C), and a clamping plate 301 (shown in FIG. 3), as described further below.

A conventional window actuator 1104 (such as the KIMO 202 model by Nekos SRL, Colceresa (VI), Italy) having a conventional push-pull actuator chain 104, can be used to open and close the movable portion 1101 of window 1106, without having direct physical human contact with the window. The actuator chain 104 includes, for example, inner plates 104a, 104b, outer plates 104c, 104d, window chain linkage 104e, pinhole 104f, and pins 104g, 104h, which are conventional and part of the KIMO 202 actuator.

Barrel brackets 101a, 101b are separated by a space into which the window chain linkage 104e is positioned. When window chain linkage 104e is positioned between the barrel brackets 101a, 101b, the window chain linkage 104e and barrel brackets 101a, 101b are kept in alignment by a fastener 105, such as a screw or pin, that is inserted through the respective openings, such as a conventional bore hole, of the first barrel bracket 101a, the window chain linkage 104e, and the second barrel bracket 101b, such as in an analogous manner to the two leaves of a door hinge and the hinge pin that holds them together. Barrel brackets 101a, 101b respectively include screw holes 107a, 107b. Fasteners, such as screws 109a, 109b, are inserted through screw holes 107a, 107b to respectively fasten barrel brackets 101a, 101b to desired locations along the length of bracket 106, as explained further herein. Screws 110a, 110b are respectively inserted into screw holes 108a, 108b and tightened to secure the actuator linkage assembly 100 to a moveable portion 1101 of window 1106, as shown, for example, in FIG. 11.

Figure 2A:
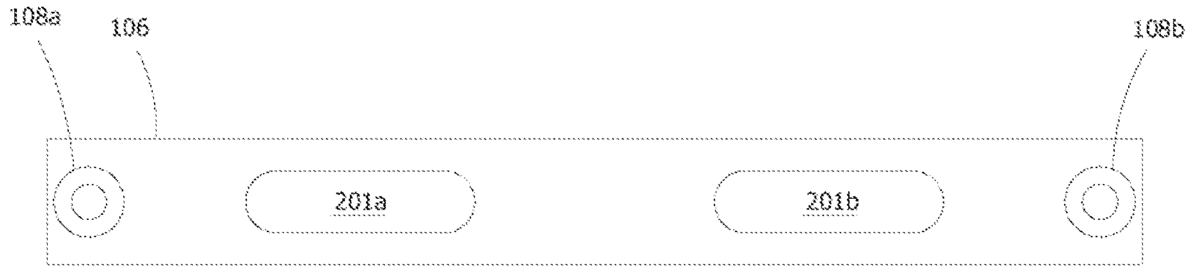
FIG. 2A is a top view of an exemplary bracket when the barrel brackets of the linkage assembly include barrel bracket extensions, as shown in FIG. 4A.
Figure 2B:
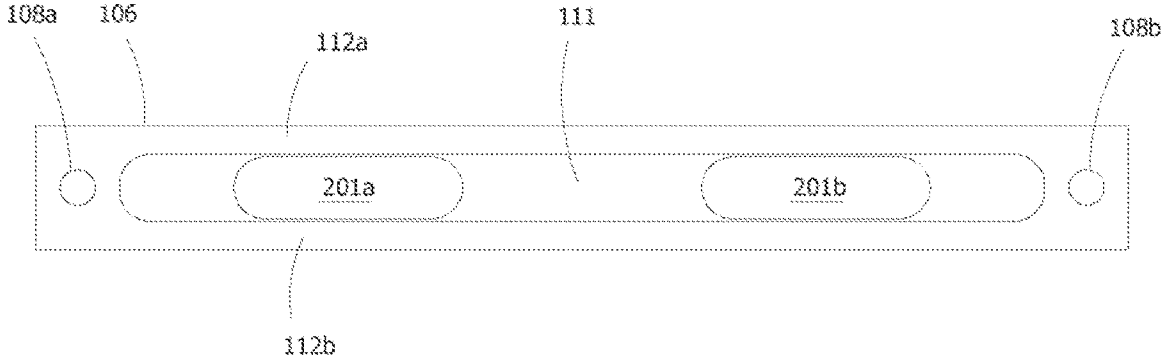
FIG. 2B is a bottom view of an exemplary bracket when the barrel brackets of the linkage assembly include barrel bracket extensions, as shown in FIG. 4A.
Figure 2C:
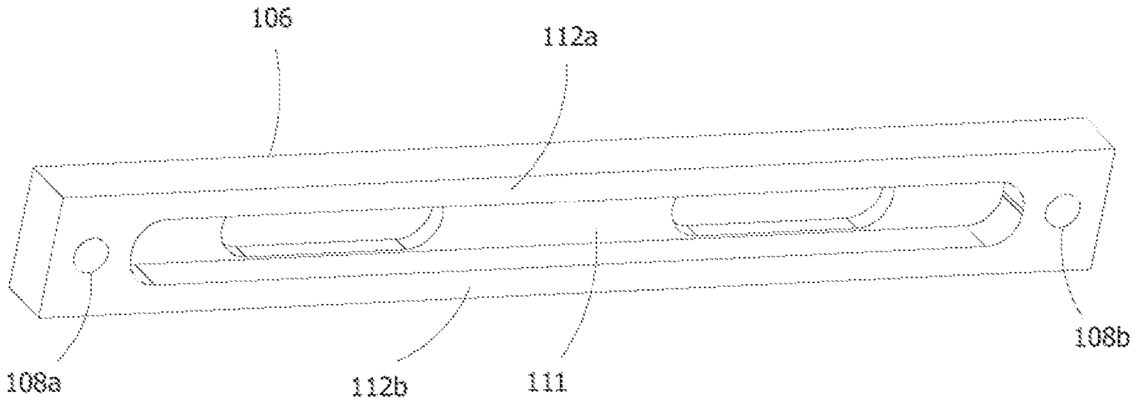
FIG. 2C is a bottom perspective view of an exemplary bracket when the barrel brackets of the linkage assembly include barrel bracket extensions, as shown in FIG. 4A.

FIG. 2A is a top view of an exemplary bracket 106, FIG. 2B is a bottom view of an exemplary bracket 106, and FIG. 2C is a bottom perspective view of an exemplary bracket 106. In an embodiment, the bracket 106 has two oblong slotted holes 201a, 201b, which can be equidistant from a midpoint along the length of the bracket 106. Screw 109a is inserted through screw hole 107a of barrel bracket 101a and through oblong slotted hole 201a in the bracket 106. Similarly, screw 109b is inserted through screw hole 107b of barrel bracket 101b and through oblong slotted hole 201b of the bracket 106. Barrel brackets 101a, 101b can be positioned along the length of oblong slotted holes 201a, 201b. At least a portion of the bottom surface of each barrel bracket 101a, 101b is in direct (or indirect) contact with a top surface of the bracket 106. Thus, barrel brackets 101a, 101b can respectively be positioned along a length of oblong slotted holes 201a, 201b such that at least a portion of the top surface of the bracket 106 directly (or indirectly) contacts at least a portion of the bottom surface of barrel brackets 101a, 101b.

Figure 2D:
FIG. 2D is a top view of an exemplary bracket when the barrel brackets of the linkage assembly do not include barrel bracket extensions, as shown in FIG. 4B.
Figure 2E:
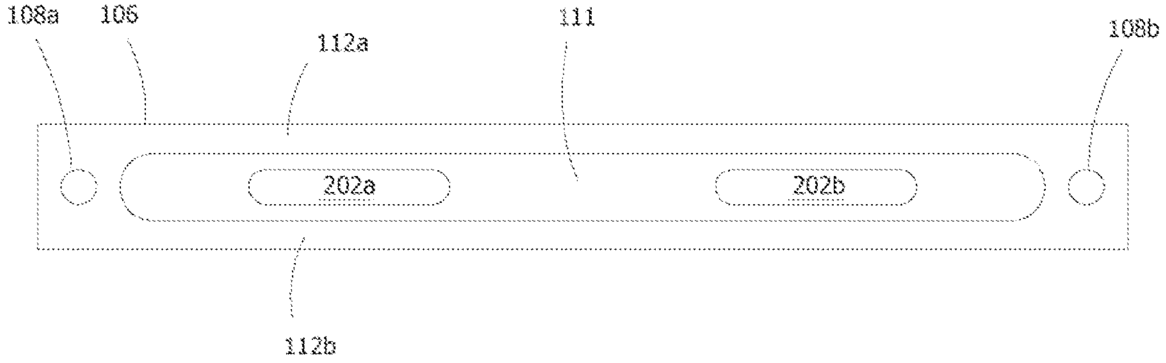
FIG. 2E is a bottom view of an exemplary bracket when the barrel brackets of the linkage assembly do not include barrel bracket extensions, as shown in FIG. 4B.
Figure 2F:
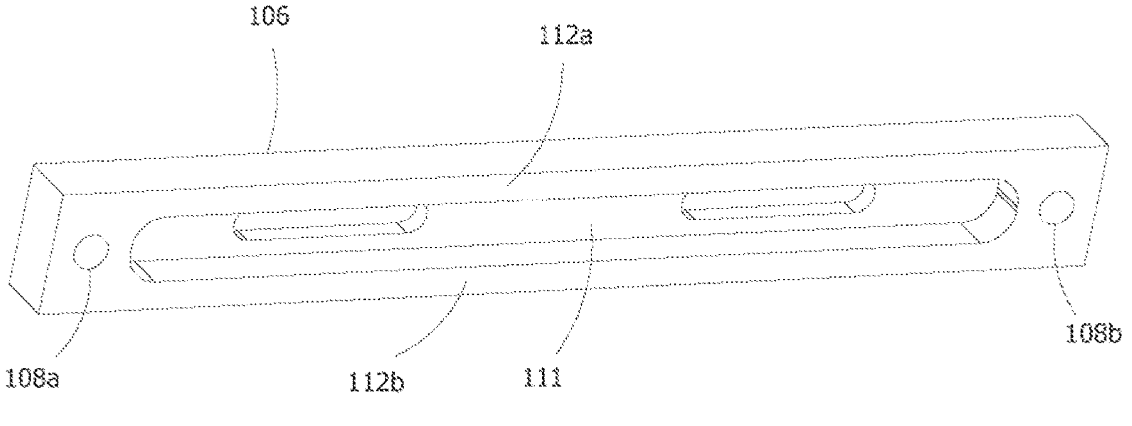
FIG. 2F is a bottom perspective view of an exemplary bracket when the barrel brackets of the linkage assembly do not include barrel bracket extensions, as shown in FIG. 4B.
Figure 4A:
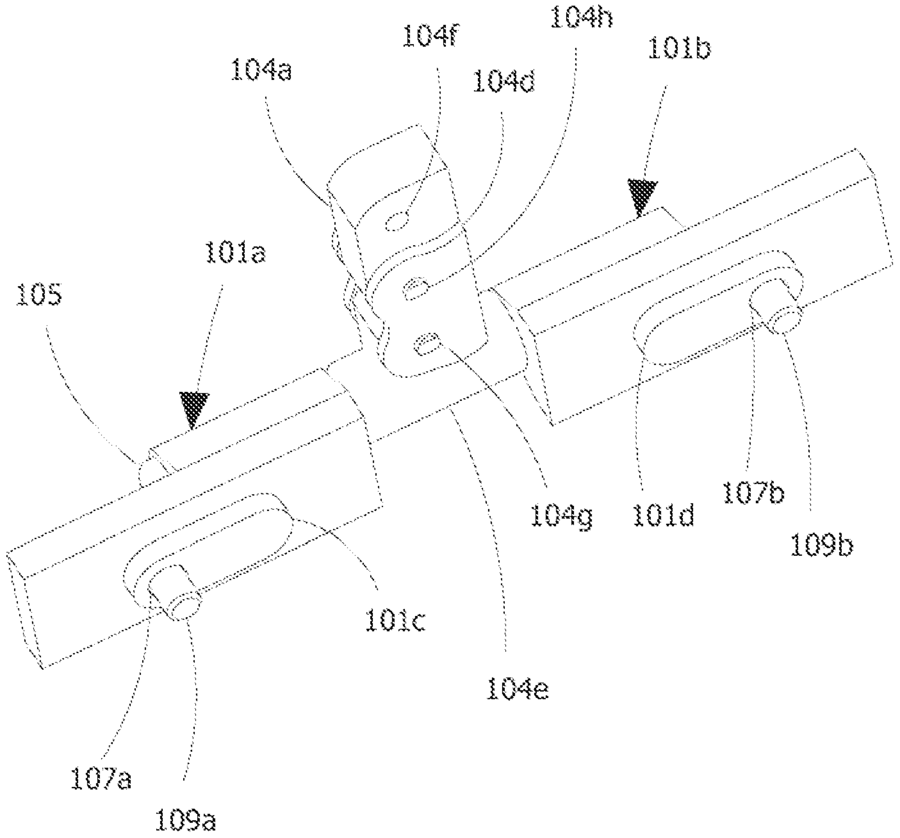
FIG. 4A is an isometric bottom view of a linkage assembly that utilizes barrel bracket extensions.
Figure 4B:
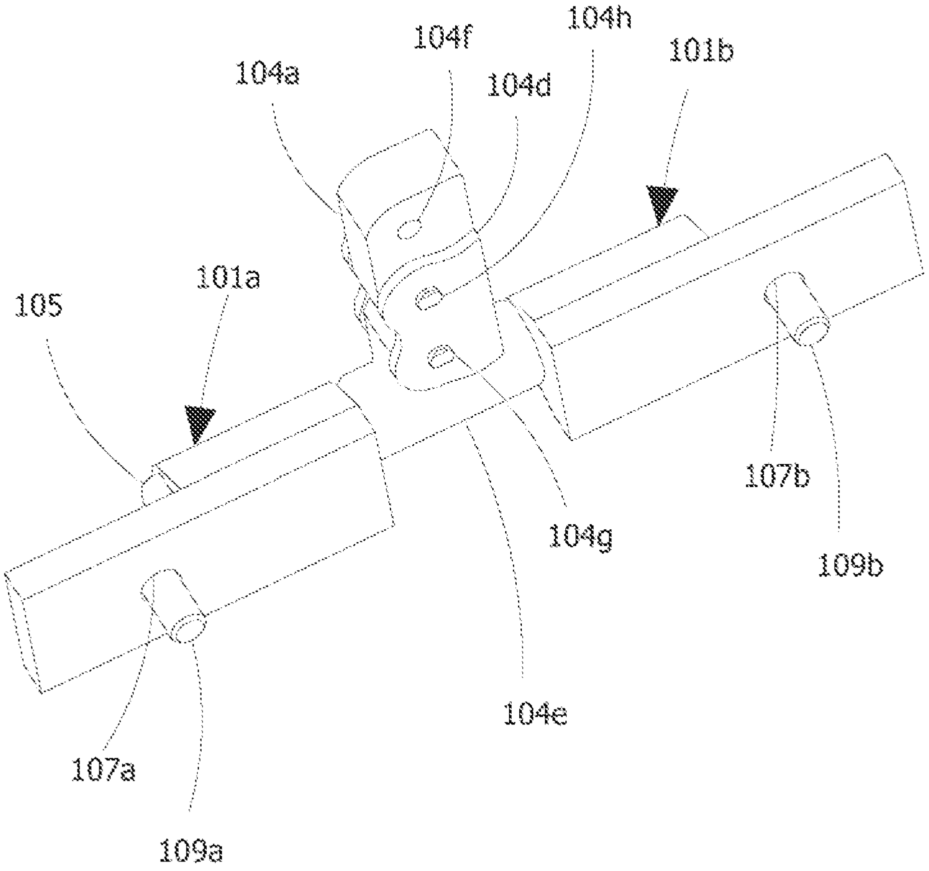
FIG. 4B is an isometric bottom view of a linkage assembly that does not utilize barrel bracket extensions.

FIG. 2D is a top view of an exemplary bracket 106 when the barrel brackets 101a, 101b of the linkage assembly 100 do not include barrel bracket extensions 101c, 101d, as shown in FIG. 4B. FIG. 2E is a bottom view of an exemplary bracket 106 when the barrel brackets 101a, 101b of the linkage assembly 100 do not include barrel bracket extensions 101c, 101d, as shown in FIG. 4B. FIG. 2F is a bottom perspective view of an exemplary bracket 106 when the barrel brackets 101a, 101b of the linkage assembly 100 do not include barrel bracket extensions 101c, 101d, as shown in FIG. 4B.

In an embodiment, the bracket 106 has two oblong slotted holes 202a, 202b, which can be equidistant from a midpoint along the length of the bracket 106. Generally, slotted holes 202a, 202b will have a smaller transverse width than the corresponding transverse width of slotted holes 201a, 201b, because slotted holes 202a, 202b can be sized to accommodate the diameter of screws 108a, 108b, whereas slotted holes 201a, 201b are sized to accommodate the relatively larger transverse width of bracket extensions 101c, 101d that are used with barrel bracket extensions 101c, 101d.

In FIGS. 2D-2F, screw 109a is inserted through screw hole 107a of barrel bracket 101a and through oblong slotted hole 202a in the bracket 106. Similarly, screw 109b is inserted through screw hole 107b of barrel bracket 101b and through oblong slotted hole 202b of the bracket 106. Thus, barrel brackets 101a, 101b can respectively be positioned along a length of oblong slotted holes 202a, 202b such that at least a portion of the top surface of the bracket 106 directly (or indirectly) contacts at least a portion of the bottom surface of barrel brackets 101a, 101b.

Figure 3:
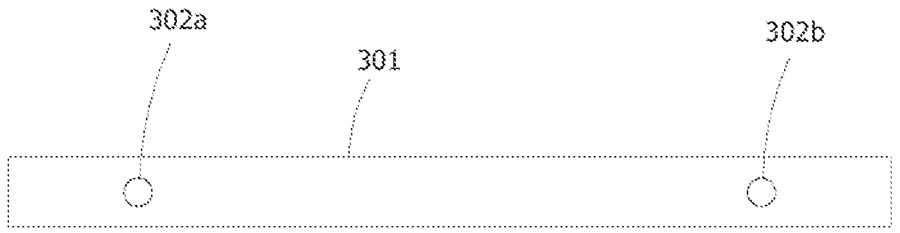
FIG. 3 is a top view of an exemplary clamping plate.

FIG. 3 is a top view of an exemplary clamping plate 301 that fits into and is positioned within the channel 111 of the bracket 106. Clamping plate 301 has threaded holes 302a, 302b. Screw 109a, which is inserted through screw hole 107a of barrel bracket 101a and through oblong slotted hole 201a in the bracket 106, threads into threaded screw hole 302a. Similarly, screw 109b, which is inserted through screw hole 107b of barrel bracket 101b and through oblong slotted hole 201b in the bracket 106, threads into threaded screw hole 302b. Thus, at least a portion of the top surface of the clamping plate 301 is in direct (or indirect) contact with at least a portion of the bottom surface of the bracket 106.

FIG. 4A is an isometric bottom view of a first embodiment of actuator linkage assembly 100. FIG. 4A shows barrel bracket extensions 101c, 101d, which can optionally be respectively provided as part of barrel brackets 101a, 101b. Barrel bracket extensions 101c, 101d, respectively fit into and slidably engage within oblong slotted holes 201a, 201b. The length of barrel bracket extensions 101c, 101d can be sized to provide a desired range of movement, with longer extensions 101c, 101d providing a more limited range of movement, and shorter extensions 101c, 101d providing a wider range of movement within oblong slotted holes 201a, 201b. The thickness of barrel bracket extensions 101c, 101d is preferably the same as or slightly less that the thickness of oblong slotted holes 201a, 201b.

When barrel bracket extensions 101c, 101d are utilized, screw 109a is inserted through screw hole 107a, which extends through barrel bracket 101a and barrel bracket extension 101c, and is threaded into threaded screw hole 302a of clamping plate 301. Similarly, screw 109b is inserted through screw hole 107b, which extends through barrel bracket 101b and barrel bracket extension 101d, and is threaded into threaded screw hole 302b of clamping plate 301. Screw holes 107a, 107b are preferably unthreaded.

FIG. 4B shows barrel brackets 101a, 101b without the respective barrel bracket extensions 101c, 101d. FIG. 4B also shows how the screw holes 302a, 302b of clamping plate 301 align with the screw holes 107a, 107b of barrel brackets 101a, 101b. When barrel bracket extensions 101c, 101d are not utilized, screw 109a is inserted through screw hole 107a, which extends through barrel bracket 101a and barrel bracket extension 101c, and is threaded into threaded screw hole 302a of clamping plate 301. Similarly, screw 109b is inserted through screw hole 107b, which extends through barrel bracket 101b and barrel bracket extension 101d, and is threaded into threaded screw hole 302b of clamping plate 301. Screw holes 107a, 107b are preferably unthreaded.

Figure 5A:
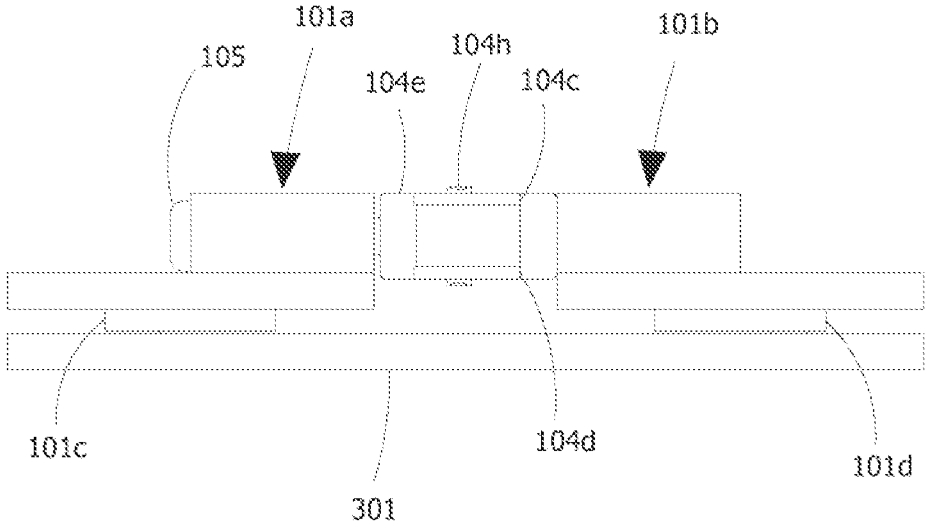
FIG. 5A is a partial cut-away view of FIG. 1, along line 5-5 that includes barrel bracket extensions.
Figure 5B:
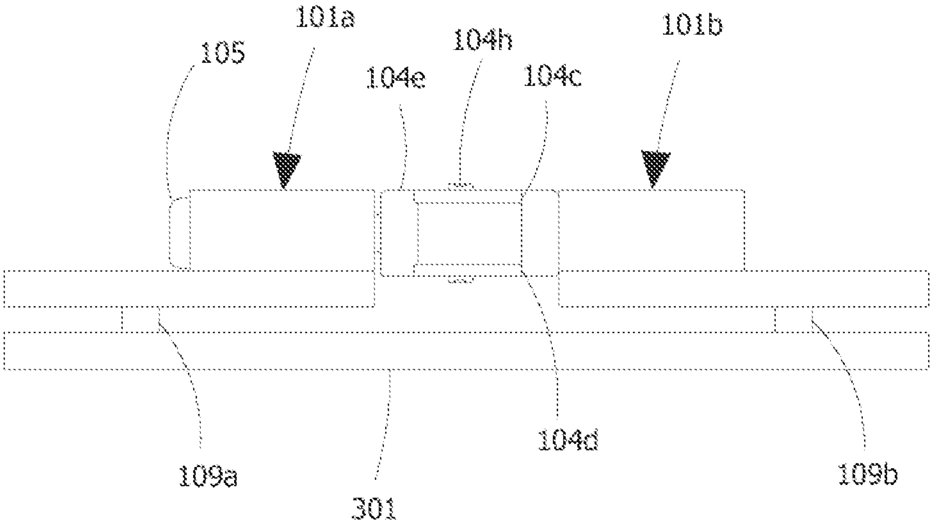
FIG. 5B shows a view of FIG. 5A that does not include barrel bracket extensions.

FIG. 5A is a partial cutaway view of FIG. 1 along line 5-5 (omitting bracket 106), showing barrel bracket extensions 101c, 101d and clamping plate 301 in an exemplary position. FIG. 5B shows a view of FIG. 5A that does not include barrel bracket extensions 101c, 101d, while showing clamping plate 301 and screws 109a, 109b. When screws 109a, 109b are tightened in threaded screw holes 302a, 302b, the clamping plate 301 will come into contact with at least a portion of the bottom surface of the bracket 106.

Figure 6:
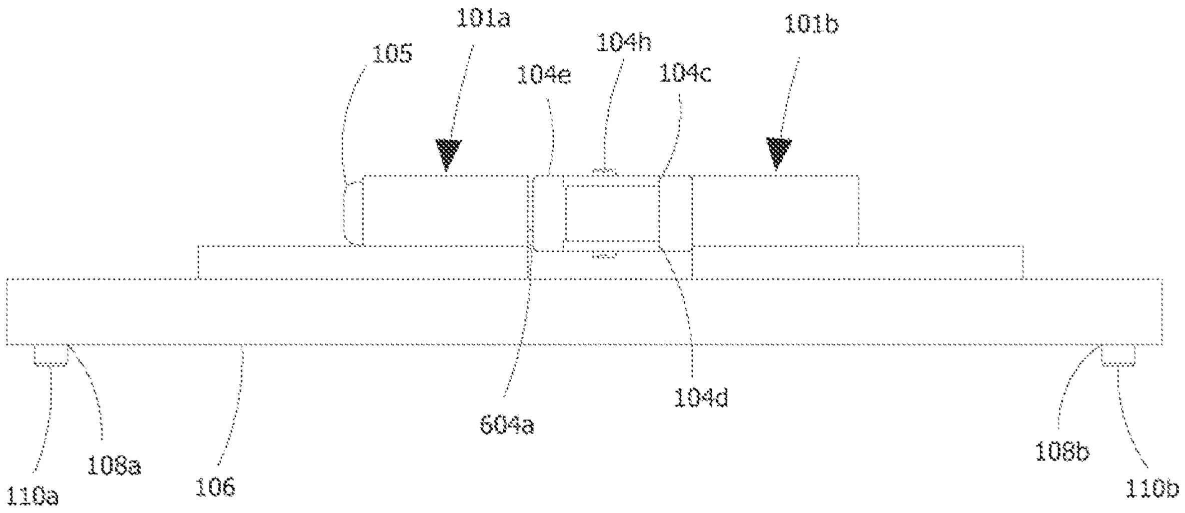
FIG. 6 is a front view of FIG. 1.

FIG. 6 is a front view of FIG. 1. Screws 110*a*, 110*b* are shown extending through screw holes 108*a*, 108*b* of bracket 106 to secure the bracket 106, for example, to the movable portion 1101. In addition, barrel brackets 101*a*, 101*b* can also be sized to provide a clearance 604*a* between barrel bracket 101*a* and window chain linkage 104*e* in order to allow the window chain linkage 104*e* to freely rotate about the fastener 105. As the clearance 604*a* also allows the window chain linkage 104*e* to slide horizontally along fastener 105, an analogous clearance 604*b* (not shown) may also appear between barrel bracket 101*b* and window chain linkage 104*e*, in addition to or in lieu of clearance 604*a*. Generally, clearances 604*a*, 604*b* will appear when window chain linkage 104*e* is not in contact with either barrel bracket 101*a* or barrel bracket 101*b*.

Figure 7:
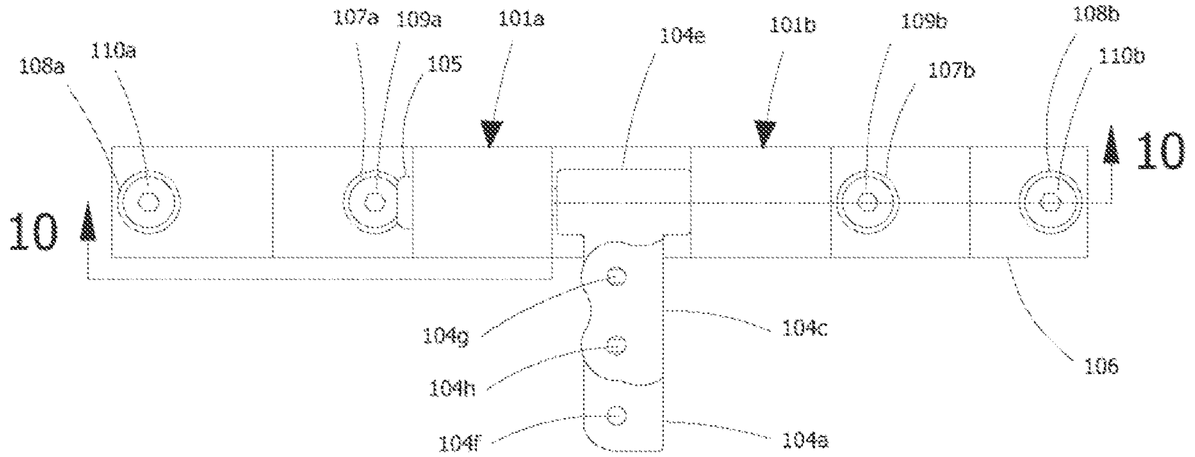
FIG. 7 is a top view of FIG. 1, with section line 10-10.

FIG. 7 is a top view of FIG. 1, with section line 10-10. FIGS. 1 and 7 will be discussed together. An end of actuator chain 104 includes, for example, inner plates 104*a*, 104*b*, outer plates 104*c*, 104*d*, window chain linkage 104*e*, pinhole 104*f*, and pins 104*g*, 104*h*, which are typically provided as part of a conventional actuator. An opposing end of actuator chain 104 is secured internally within the actuator 1104 (shown in FIG. 11) to operably connect the chain 104 to the motor of actuator 1104. Pin 104*g* extends through one end of outer plate 104*c* to secure outer plate 104*c* to an extending portion of window chain linkage 104*e*. Elements analogous to inner plates 104*a*, 104*b*, outer plates 104*c*, 104*d*, pinhole 104*f*, pins 104*g*, and an actuator chain linkage (not shown) similar to window chain linkage 104*e*, are also typically provided as part of a conventional actuator, and are positioned at the opposing end of chain 104.

Figure 8:
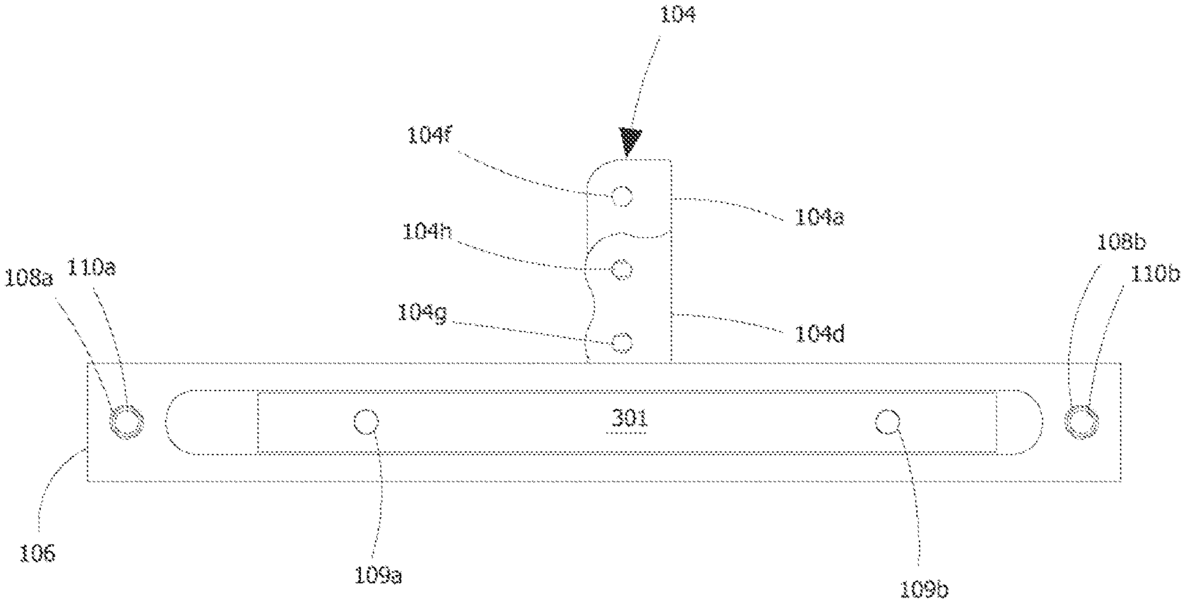
FIG. 8 is a bottom view of FIG. 1.

FIG. 8 is a bottom view of FIG. 1. Screws 109*a*, 109*b* are shown extending through screw holes 107*a*, 107*b* (not shown) of clamping plate 301 to secure the barrel brackets 101*a*, 101*b* and clamping plate 301 to bracket 106. Screws 110*a*, 110*b* are shown extending through screw holes 108*a*, 108*b*, to secure the linkage assembly 100 to the movable portion 1101 of window 1106.

Figure 9:
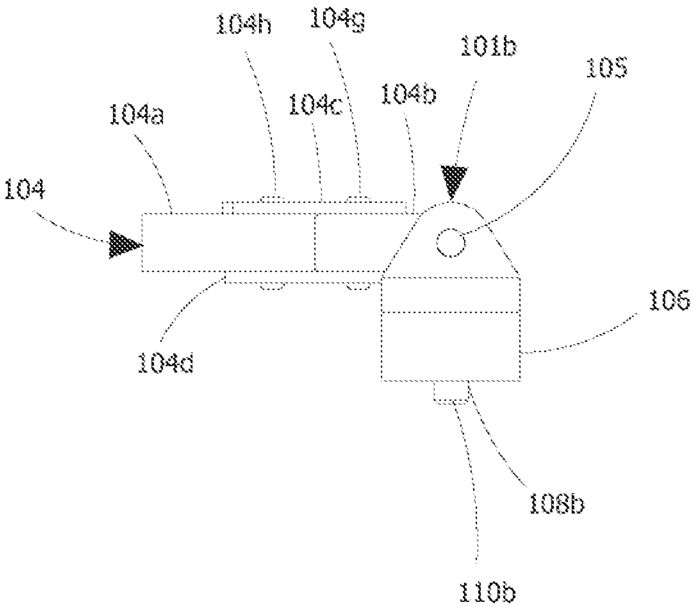
FIG. 9 is an end view of FIG. 1, looking along arrowed line 9 of FIG. 1.

FIG. 9 is an end view of FIG. 1, looking along arrowed line 9 of FIG. 1. Screw 110*b* is shown extending through screw hole 108*b* of bracket 106 to secure the bracket 106, for example, to the movable portion 1101 of window 1106.

Figure 10A:
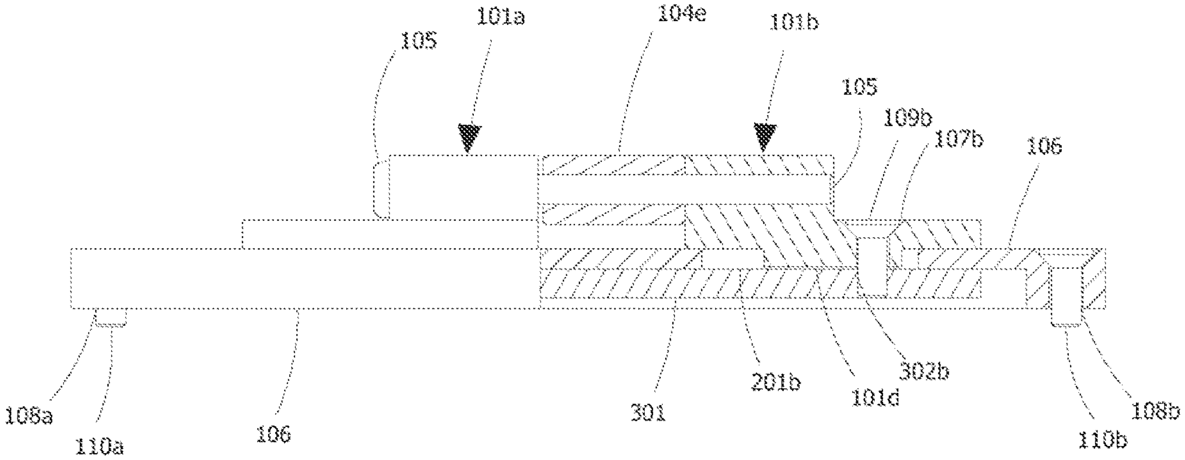
FIG. 10A is a front and partial sectional view of FIG. 7, along line 10-10 of FIG. 7.

FIG. 10A is a front and partial sectional view of FIG. 1, along line 10-10 of FIG. 7, and FIG. 7B is an isometric bottom view of FIG. 1, along line 10-10 of FIG. 7. Barrel brackets 101*a*, 101*b* can be positioned along the oblong slotted holes 201*a*, 201*b* of bracket 106 while the screws 109*a*, 109*b* are loose, to allow for desired positioning of the barrel brackets 101*a*, 101*b* and clamping plate 301 along the oblong slotted holes 201*a*, 201*b* in the bracket 106, to achieve good alignment of the actuator chain 104 generally, and to position window chain linkage 104*e* to facilitate proper closure of the moveable portion 1101 of window 1106 without binding of the window chain 104 and window chain linkage 104*e* as they retract into actuator 1104. Barrel brackets 101*a*, 101*b* are secured in position along the bracket 106 when the screws 109*a*, 109*b* are turned and respectively tightened by the threaded screw holes 302*a*, 302*b* of clamping plate 301. Screws 110*a*, 110*b* are respectively inserted into screw holes 108*a*, 108*b* and tightened to secure the actuator linkage assembly 100 to a moveable portion 1101 of window 1106, as shown, for example, in FIG. 10.

Figure 10B:
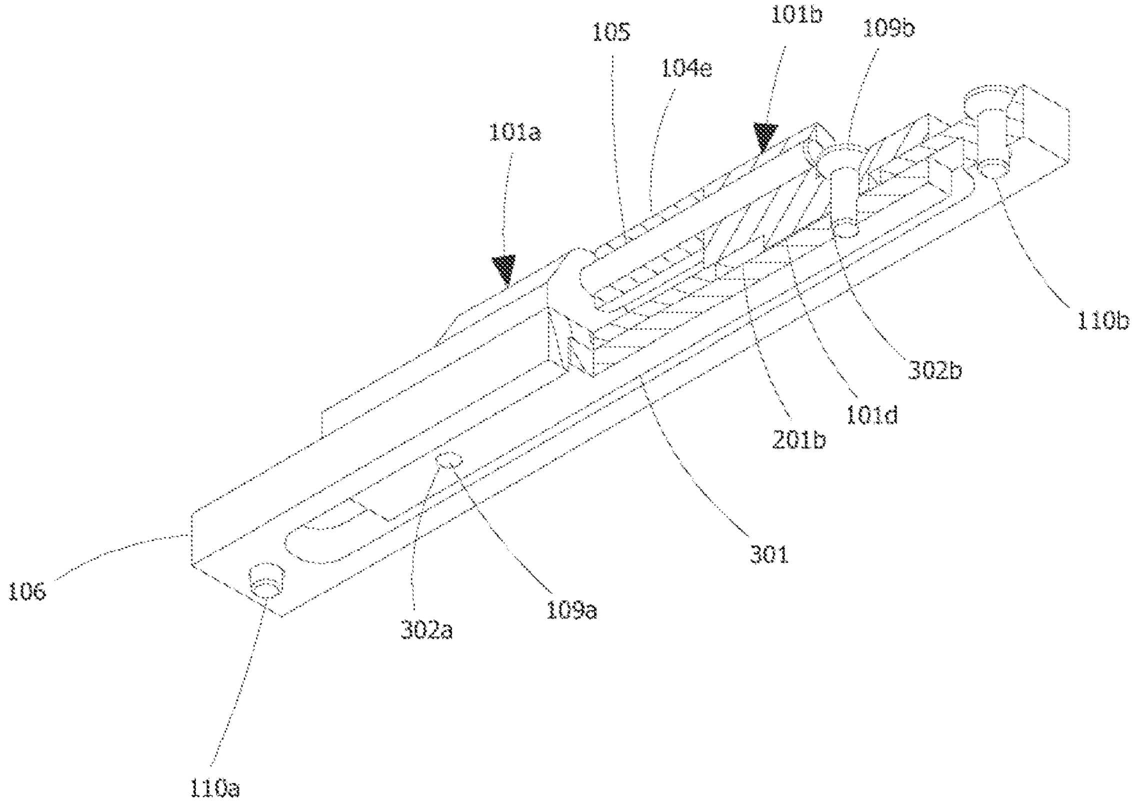
FIG. 10B is an isometric bottom view of FIG. 7, taken along line 10-10 of FIG. 7.
Figure 10C:
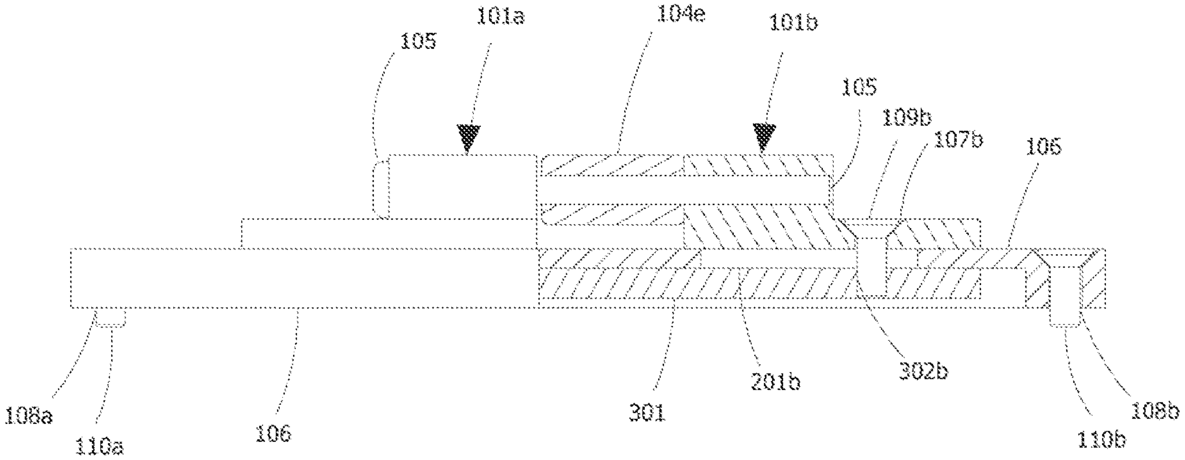
FIG. 10C is a view of FIG. 10A, without the barrel bracket extension shown in FIG. 10A.
Figure 10D:
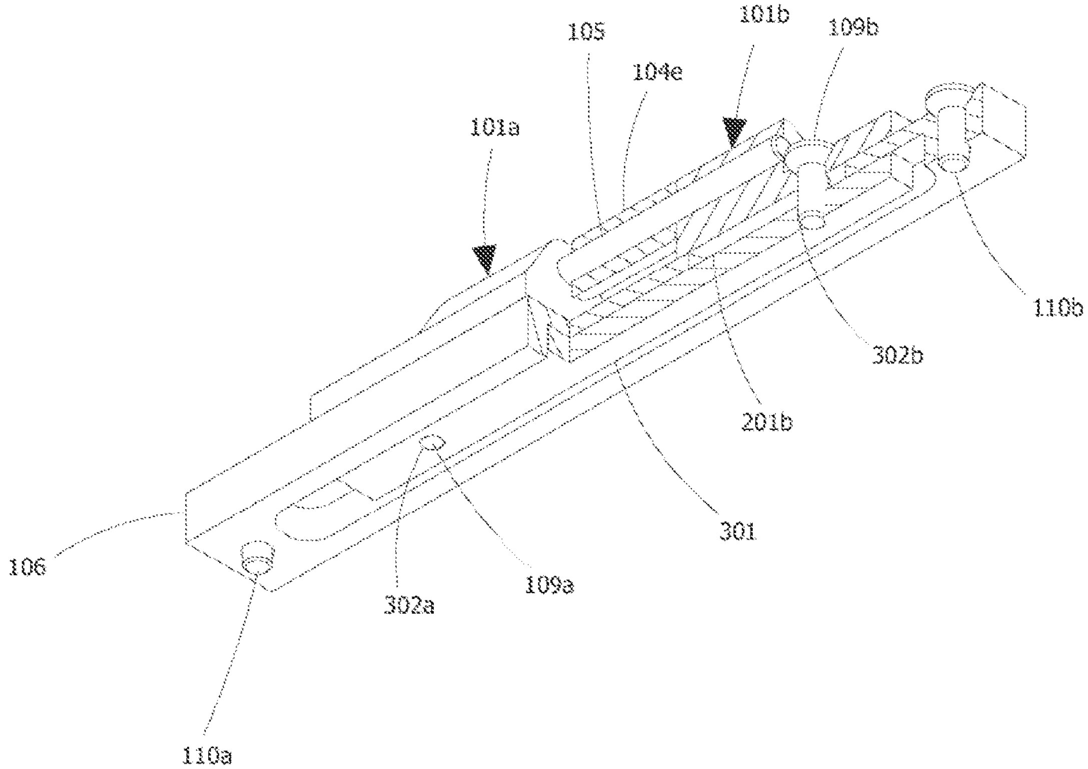
FIG. 10D is a view of FIG. 10B, without the barrel bracket extension shown in FIG. 10B.

FIG. 10C is a view of FIG. 10A, without the barrel bracket extension 101*d* shown in FIG. 10A. In FIG. 10C, screw 109*b* extends through screw hole 107*b*, oblong slotted hole 201*b*, and screw hole 302*b*. FIG. 10D is a view of FIG. 10B, without the barrel bracket extension shown in FIG. 10B. In FIG. 10D, screw 109*b* similarly extends through screw hole 107*b*, oblong slotted hole 201*b*, and screw hole 302*b*. FIGS. 10C and 10D generally operate in the same or similar manner as FIGS. 10A and 10B.

FIG. 11 is an isometric view of an assembly of an interior side of a window 1106 that includes a frame 1102 fixed in the wall 1103, and a movable portion 1101 that is spanned by glass 1105. FIG. 11 shows the 1102 moveable portion 1101 of the window 1106 opened part-way by an extended actuator chain 104 coming from an actuator 1104 that is mounted on and recessed in the window frame 1102.

Figure 12:
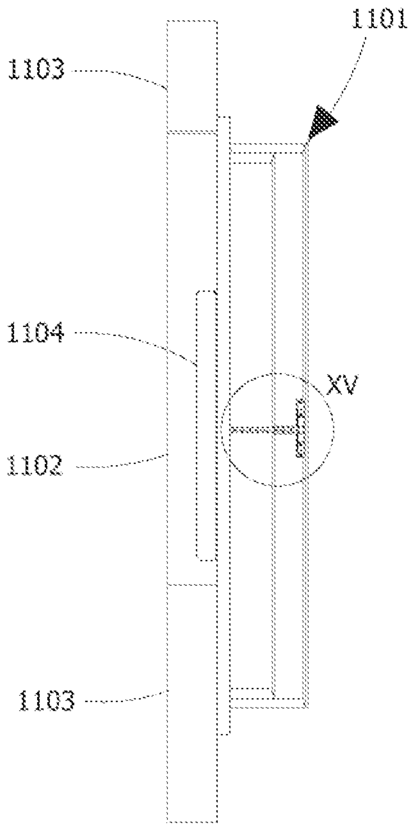
FIG. 12 is an elevation view of FIG. 11, viewed along arrow 12.

FIG. 12 is an elevation view of FIG. 11, viewed along arrow 12. The backside of the actuator 1104 is shown in the window frame 1102, with the actuator 1104 generally recessed in the window frame 1102. The window chain linkage 104*e* on an end of the actuator chain 104 is connected to the first barrel bracket 101*a* and the second barrel bracket 101*b* by fastener 105, as described above with regard to FIG. 1. As previously described, barrel brackets 101*a*, 101*b* are secured to the bracket 106 (not shown) when screws 109*a*, 109*b* are tightened. Bracket 106, in turn, is secured to the movable portion 1101 of the window 1106 by screws 110*a*, 110*b* through screw holes 108*a*, 108*b* of bracket 106.

Figure 13:
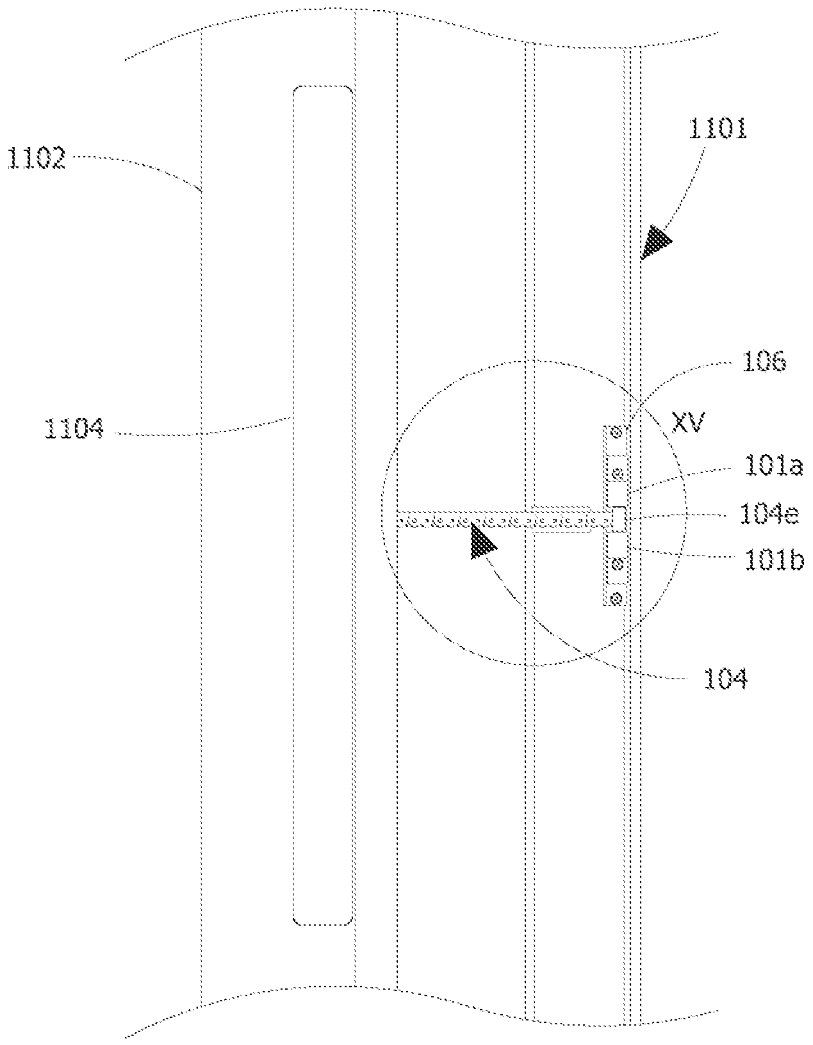
FIG. 13 is a magnified view of a portion of FIG. 12.

FIG. 13 is a magnified view of portion of FIG. 12, showing the side of moveable portion 1101 of window 1106, viewed along arrow 12 of FIG. 11. Barrel brackets 101*a* and 101*b* are connected to the bracket 106 fixed to the movable portion 1101 of the window 1106. Barrel bracket 101*a* is positioned on a first side of the window chain linkage 104*e* and barrel bracket 101*b* is positioned on an opposing side of the window chain linkage 104*e*. During installation, the window chain linkage 104*e* is inserted between the first barrel bracket 101*a* and the second barrel bracket 101*b*, and fastener 105 (such as a screw or pin), is inserted through the respective openings, such as a conventional bore hole, of the first barrel bracket 101*a*, the window chain linkage 104*e*, and the second barrel bracket 101*b*, such as in an analogous manner to the two leafs of a door hinge and the hinge pin that holds them together.

Figure 14:
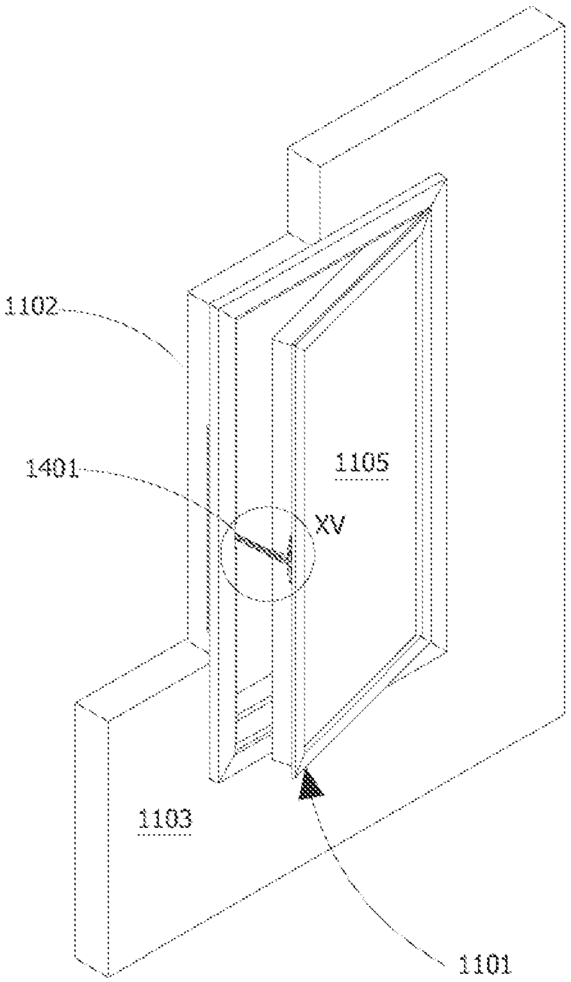
FIG. 14 is an isometric view of FIG. 11, rotated clockwise, showing the exterior side.
Figure 15:
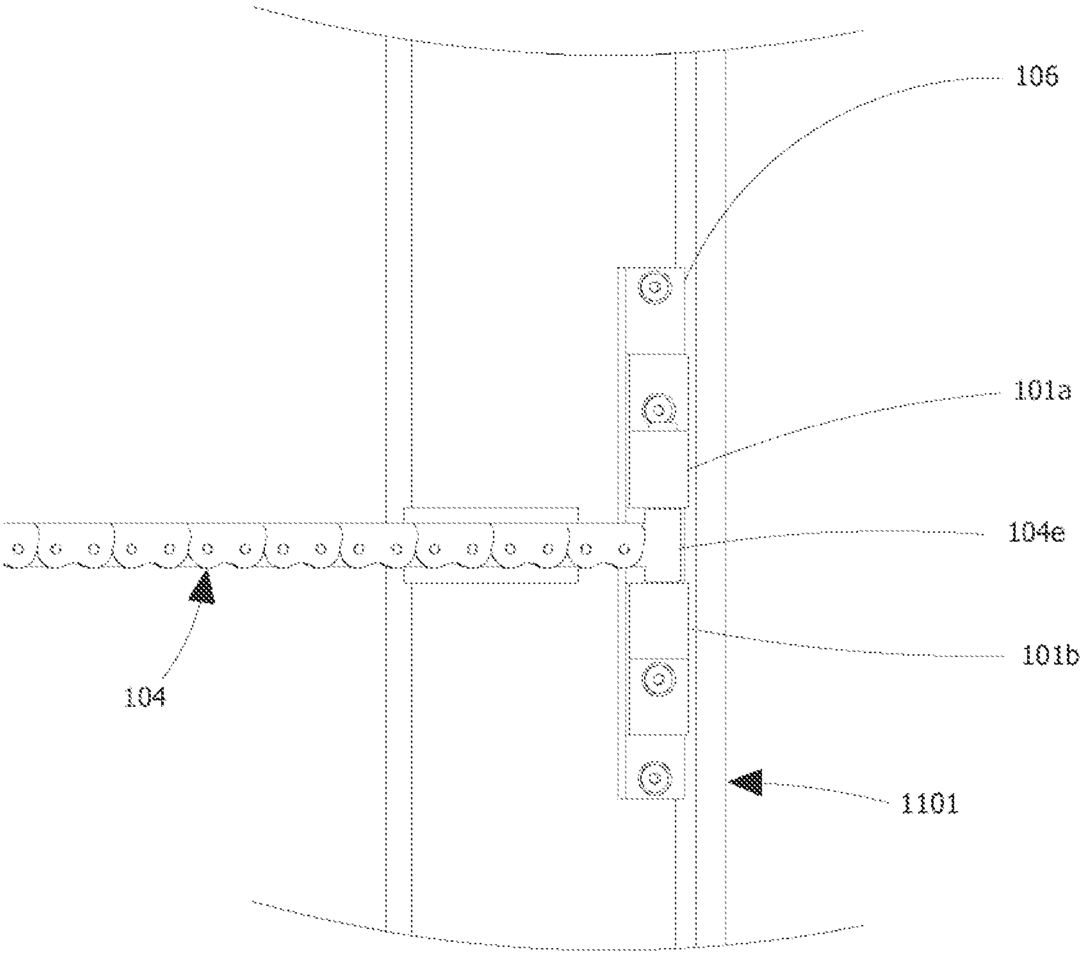
FIG. 15 is a close-up of the detail marked XV in FIGS. 11-14.

FIG. 14 is an isometric view of FIG. 11, rotated clockwise, showing the exterior side. Space 1401 is provided to receive the actuator linkage assembly 100 when the moveable portion 1101 of window 1106 is in a closed position. FIG. 15 is a close-up of the detail marked XV in FIGS. 11-14.

Referring to FIGS. 16A-16H, a second embodiment of an actuator linkage assembly 1600 is illustrated for connecting actuator chain 104 from a window actuator 1104 (shown in FIG. 11) to a movable portion 1101 of a window 1106 (shown in FIG. 11). More generally, it should be understood that the second embodiment depicted in FIGS. 16A-18E operate with FIGS. 11-15 in the same or substantially the same manner as the first embodiment depicted in FIGS. 1-10B.

Figure 16A:
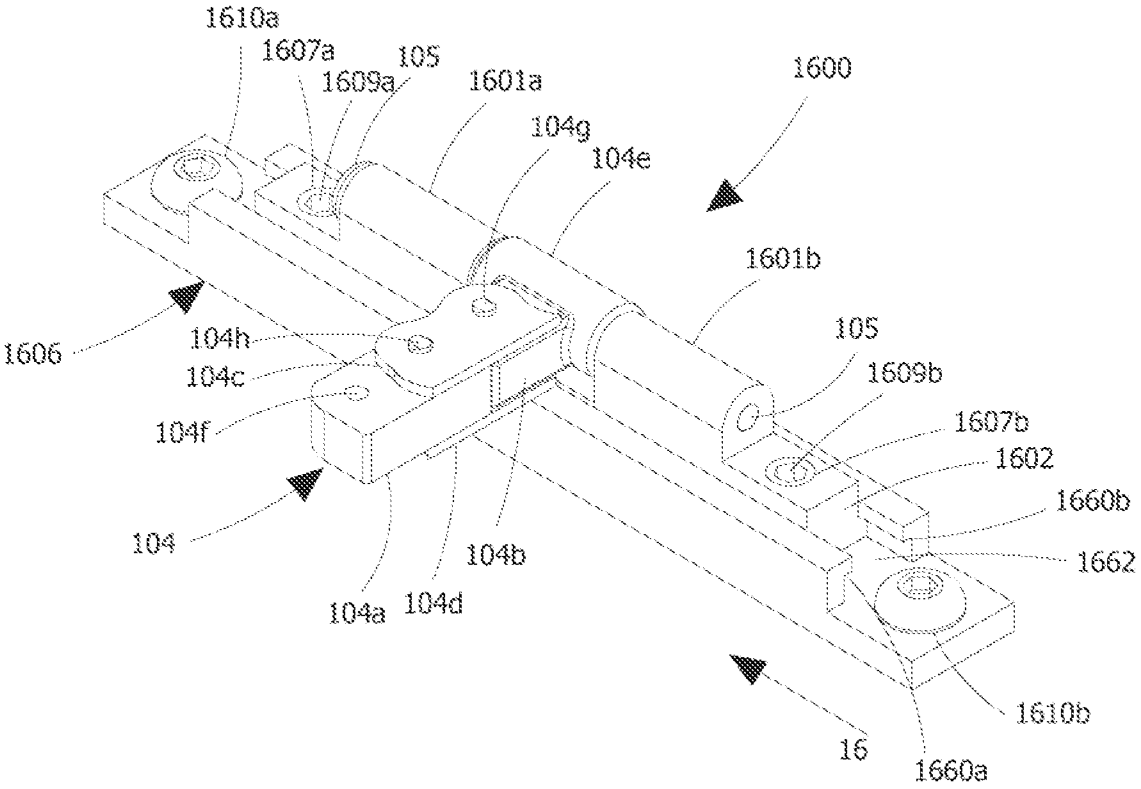
FIG. 16A is an isometric top view of a second embodiment of a linkage assembly.
Figure 16B:
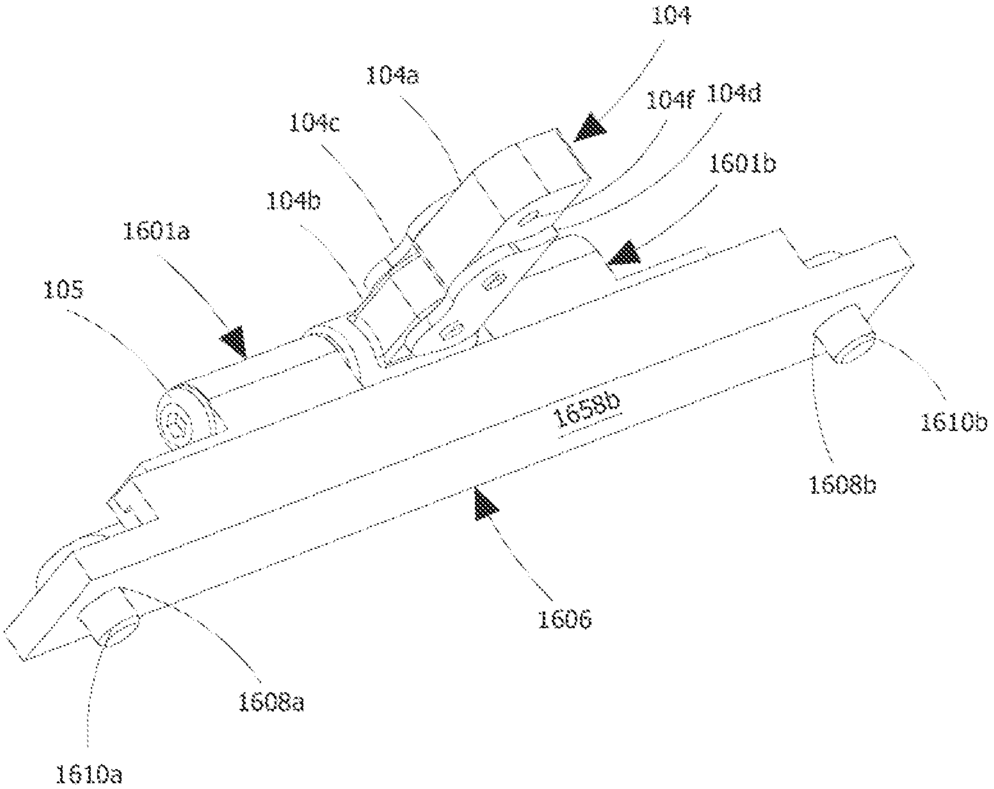
FIG. 16B is an isometric bottom view of a second embodiment of a linkage assembly.
Figure 16C:
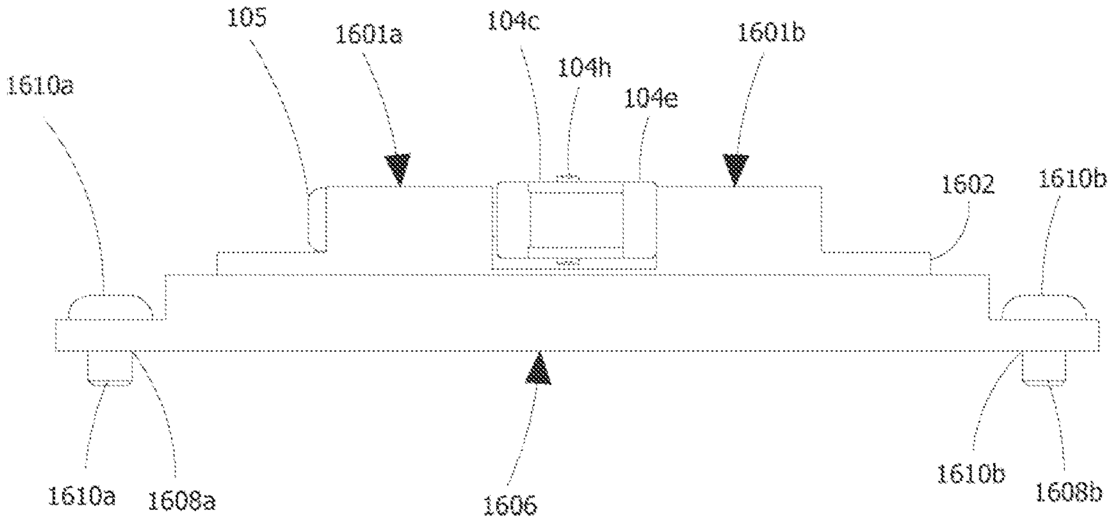
FIG. 16C is a front view of FIG. 16A.
Figure 16D:
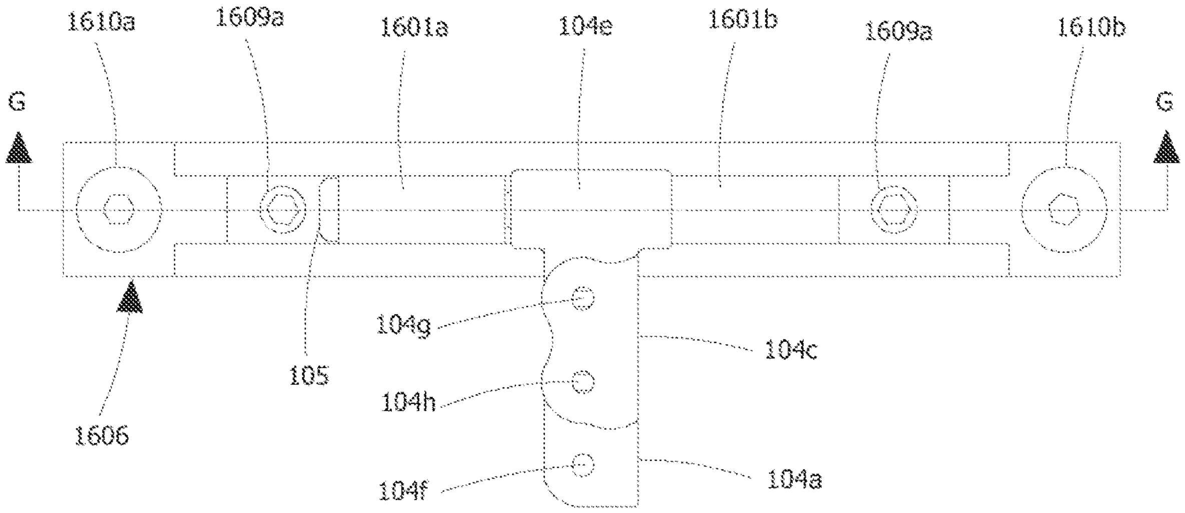
FIG. 16D is a top view of FIG. 16A, with section line G-G.
Figure 16E:
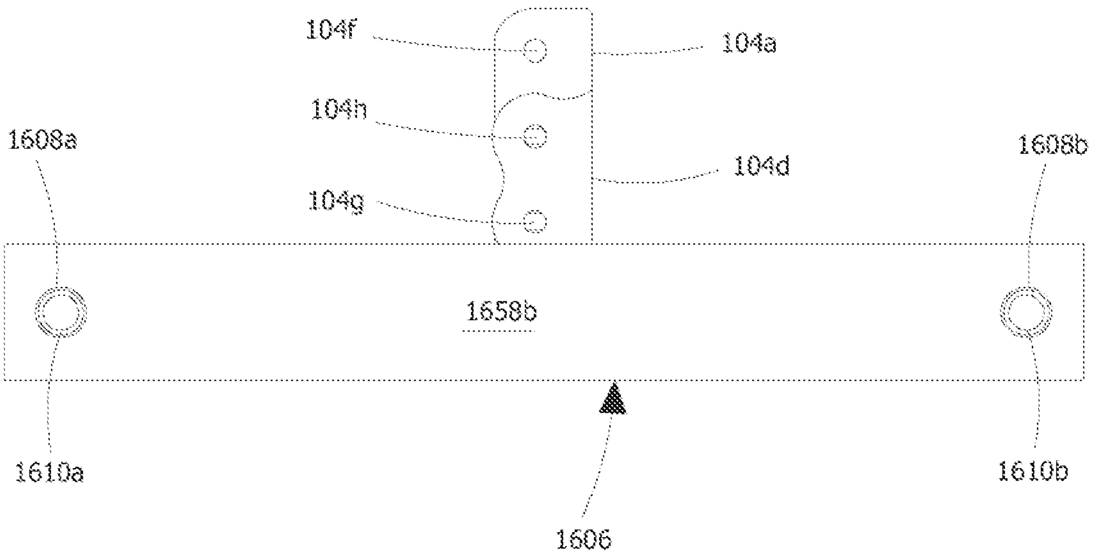
FIG. 16E is a bottom view of FIG. 16B.
Figure 16F:
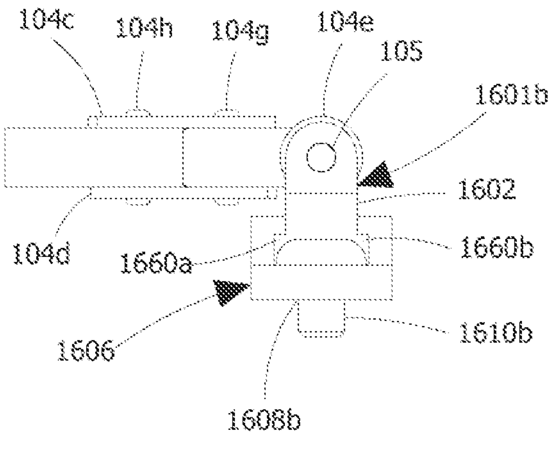
FIG. 16F is an end view of FIG. 16A, looking along arrowed line 16 of FIG. 16A.
Figure 16G:
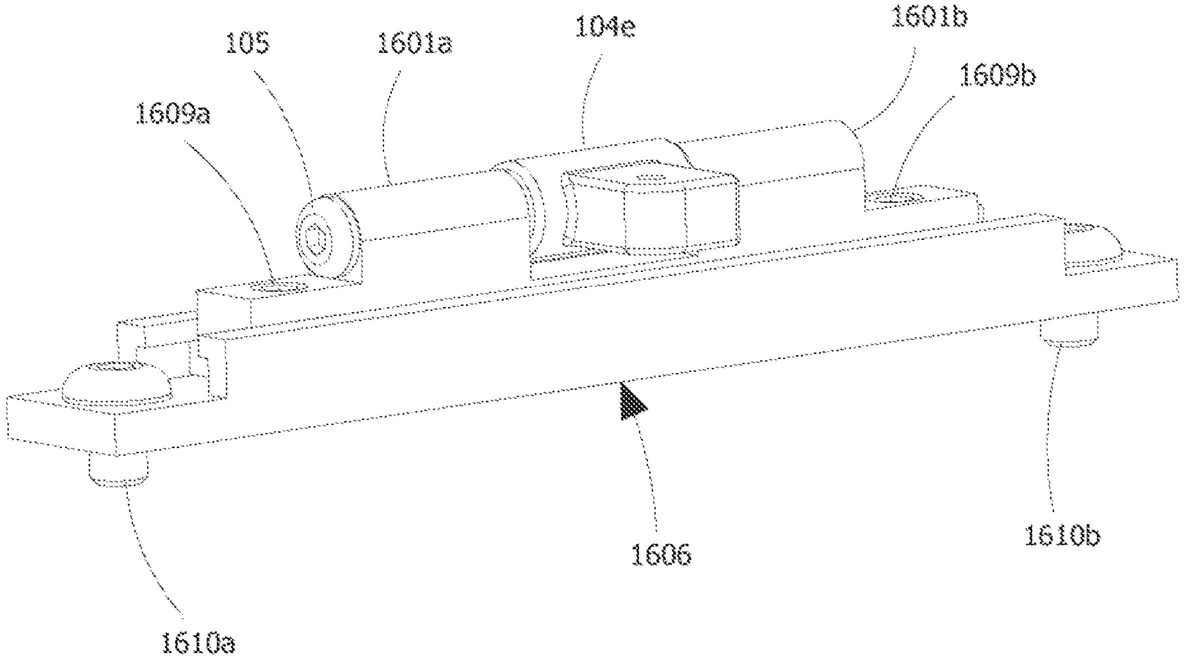
FIG. 16G is a second isometric top view of the second embodiment of the linkage assembly.

The actuator linkage assembly 1600 includes elements such as barrel brackets 1601*a*, 1601*b* that have openings 1603*a*, 1603*b* (shown in FIGS. 17A and 17B) to receive fastener 105, a T-shaped base 1602, and a slotted base bracket 1606 having an inner surface 1658*a* (shown in FIG. 16H) that slidably engages with the T-shaped base 1602 and is configured to fix the T-shaped base 1602 in a desired position along the length of the slotted base bracket 1606. As shown in FIG. 16B, the slotted base bracket 1606 has an outer surface 1658*b* for mounting to the moveable portion 1101 of window 1106 (as shown in FIG. 11).

A conventional window actuator 1104 (such as the KIMO 202 model by Nekos SRL, Colceresa (VI), Italy) having a conventional push-pull actuator chain 104, can be used to open and close the movable portion 1101 of window 1106, without having direct physical human contact with the window. The actuator chain 104 includes, for example, inner plates 104*a*, 104*b*, outer plates 104*c*, 104*d*, window chain linkage 104*e*, pinhole 104*f*, and pins 104*g*, 104*h*, which are conventional and part of the KIMO 202 actuator.

T-shaped base 1602 respectively includes screw holes 1607*a*, 1607*b*. Fasteners, such as screws 1609*a*, 1609*b*, are inserted through screw holes 1607*a*, 1607*b* to respectively fasten barrel brackets 1601*a*, 1601*b* in a desired position along the length of slotted base bracket 1606, as explained further herein. In addition, screws 1610*a*, 1610*b* are respectively inserted into screw holes 1608*a*, 1608*b* and tightened to secure the actuator linkage assembly 1600 to a moveable portion 1101 of window 1106, as shown, for example, in FIG. 11.

Figure 16H:
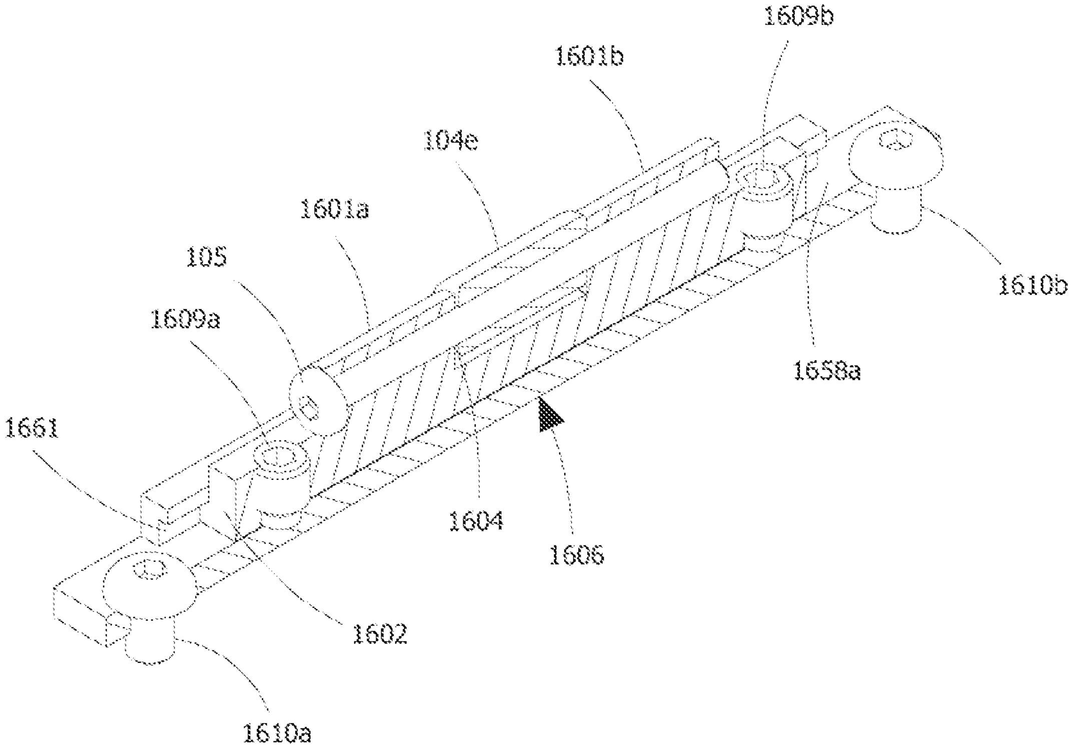
FIG. 16H is a cross sectional view of FIG. 16G along line G-G of FIG. 16D.
Figure 17A:
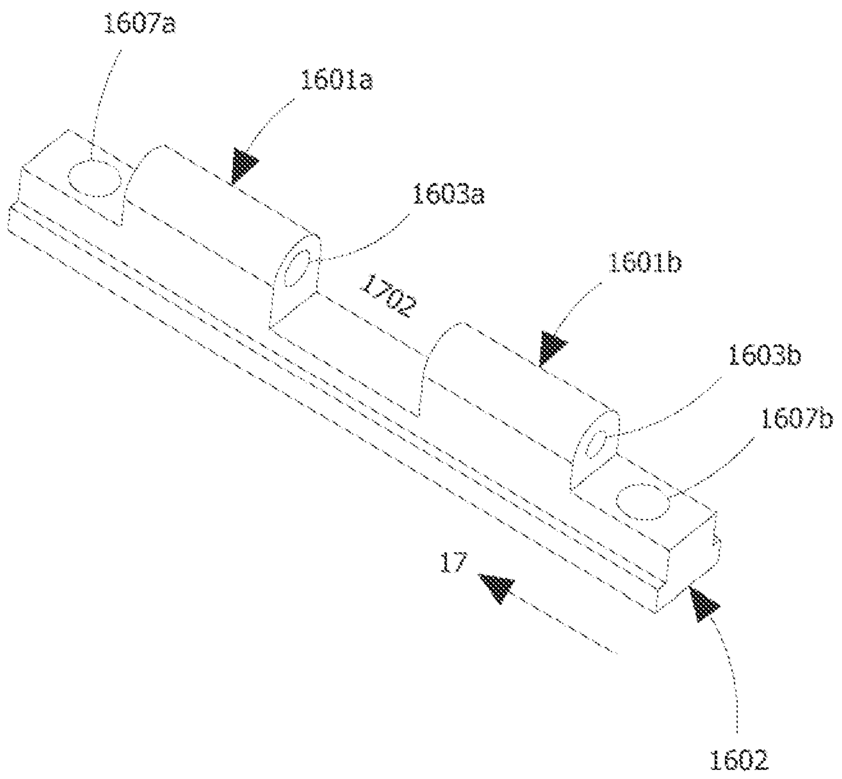
FIG. 17A is a top perspective view of a second embodiment of barrel brackets.

FIGS. 17A-17E illustrate various views of barrel brackets 1601*a*, 1601*b*. FIG. 17A shows that barrel brackets 1601*a*, 1601*b* include an opening 1702 into which the window chain linkage 104*e* is positioned. A width of opening 1702 can be sized to be slightly wider than a width of the window chain linkage 104*e* to thereby allow the window chain linkage 104*e* to be positioned within the opening 1702. In addition, as shown in FIG. 16H, barrel brackets 1601*a*, 1601*b* can also be sized to provide a clearance 1604 between barrel brackets 1601*a*, 1601*b* and window chain linkage 104*e* in order to allow the window chain linkage 104*e* to freely rotate about the fastener 105, in a same or substantially same manner as described above with regard to FIG. 6.

Figure 17B:
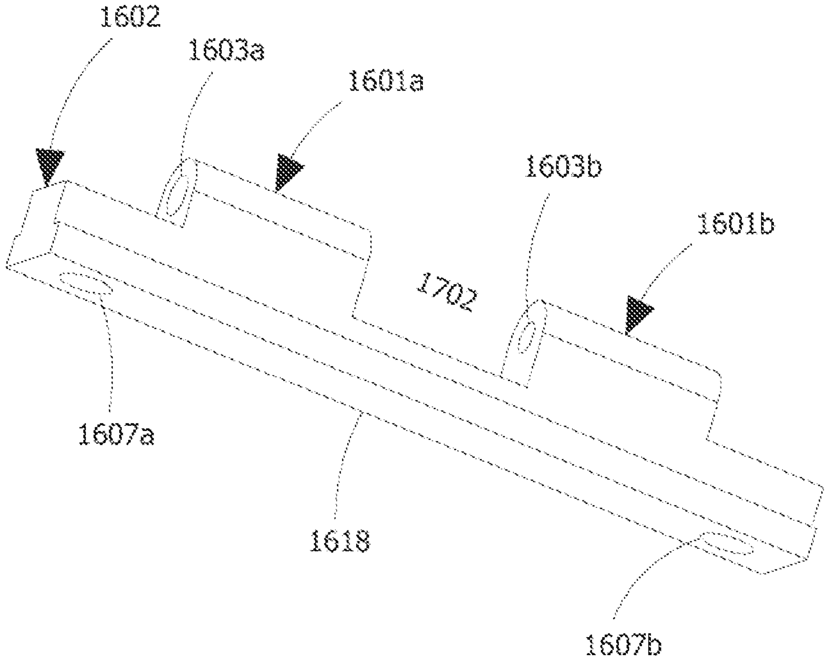
FIG. 17B is a bottom perspective view of the barrel brackets of FIG. 17A.
Figure 17C:
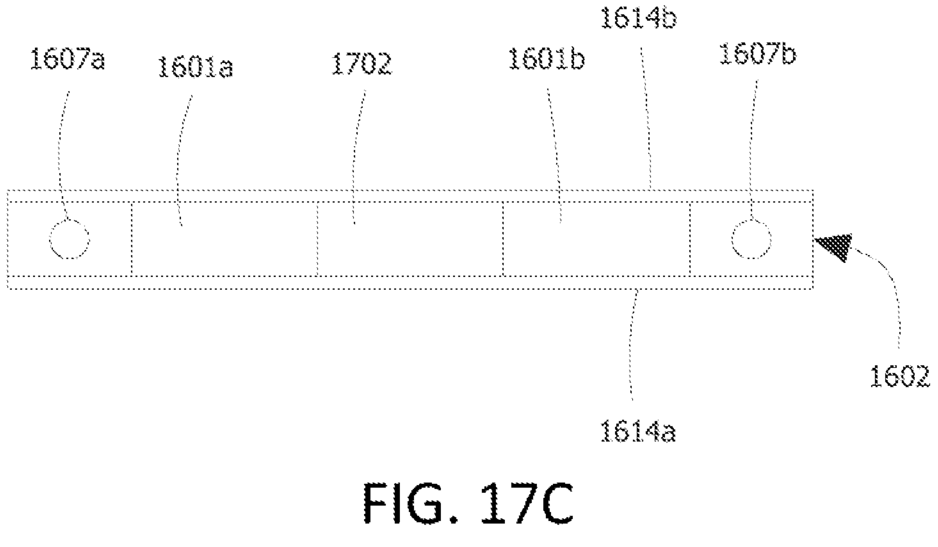
FIG. 17C is a top view of FIG. 17A.
Figure 17D:
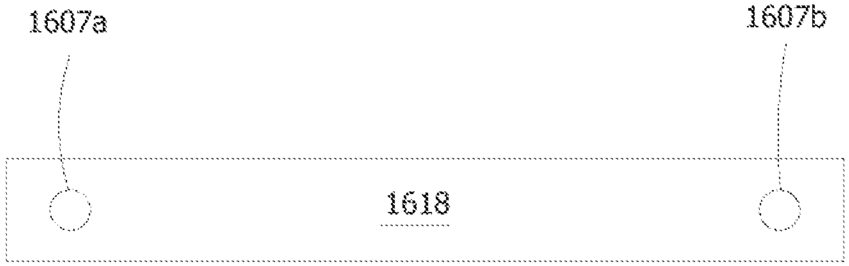
FIG. 17D is a bottom view of FIG. 17B.
Figure 17E:
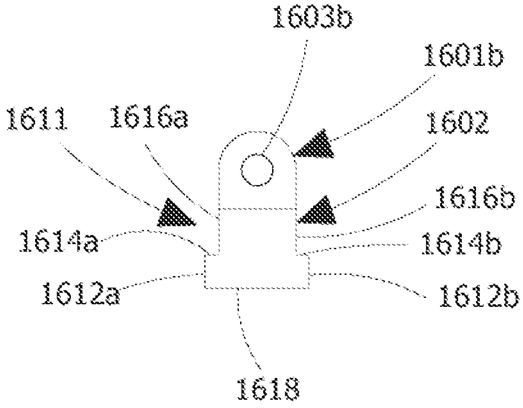
FIG. 17E is an end view of FIG. 17A, looking along arrowed line 17 of FIG. 17A.

The barrel brackets 1601*a*, 1601*b* may be in the form of an elongate extrusion (for example, of aluminium or another suitable metal) which can be cut to a suitable length. In such an embodiment, the barrel brackets 1601*a*, 1601*b* may be formed as an integrally formed element, but it should be appreciated that variations, such as barrel brackets 1601*a*, 1601*b* which are formed from two or more parts, are within the scope of the present disclosure. FIGS. 17B and 17D show the bottom surface portion 1618 of barrel brackets 1601*a*, 1601*b*.

When window chain linkage 104*e* is positioned between the barrel brackets 1601*a*, 1601*b*, in opening 1702, the window chain linkage 104*e* and barrel brackets 1601*a*, 1601*b* are kept in alignment by fastener 105, which is inserted through a respective openings 1603*a*, 1603*b*, such as a conventional bore hole, of the first and second barrel brackets 1601*a*, 1601*b*, and an opening of the window chain linkage 104*e*, as shown in FIGS. 10B and 16H, such as in an analogous manner to the two leaves of a door hinge and the hinge pin that holds them together. Aspects of FIGS. 17A-17E are discussed further below in conjunction with FIGS. 18A-E.

Figure 18A:
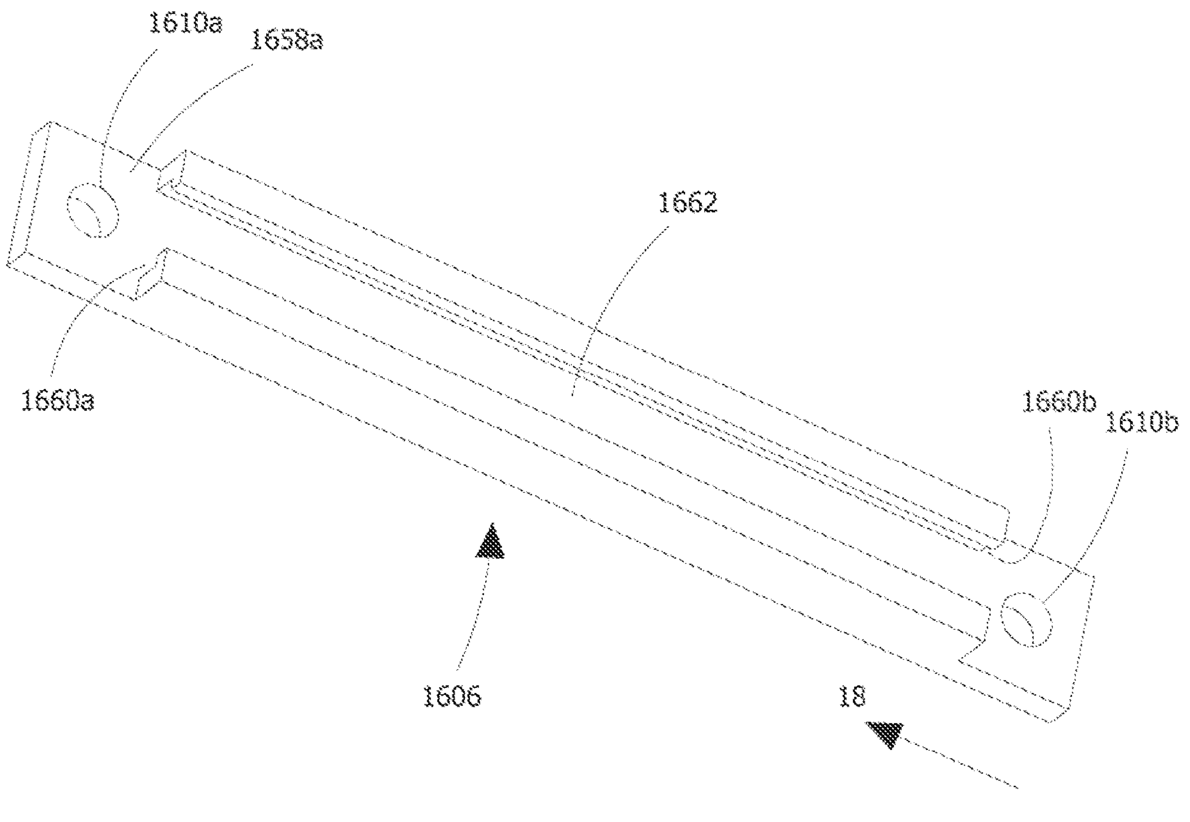
FIG. 18A is an isometric top view of an exemplary T-slot base bracket.
Figure 18B:
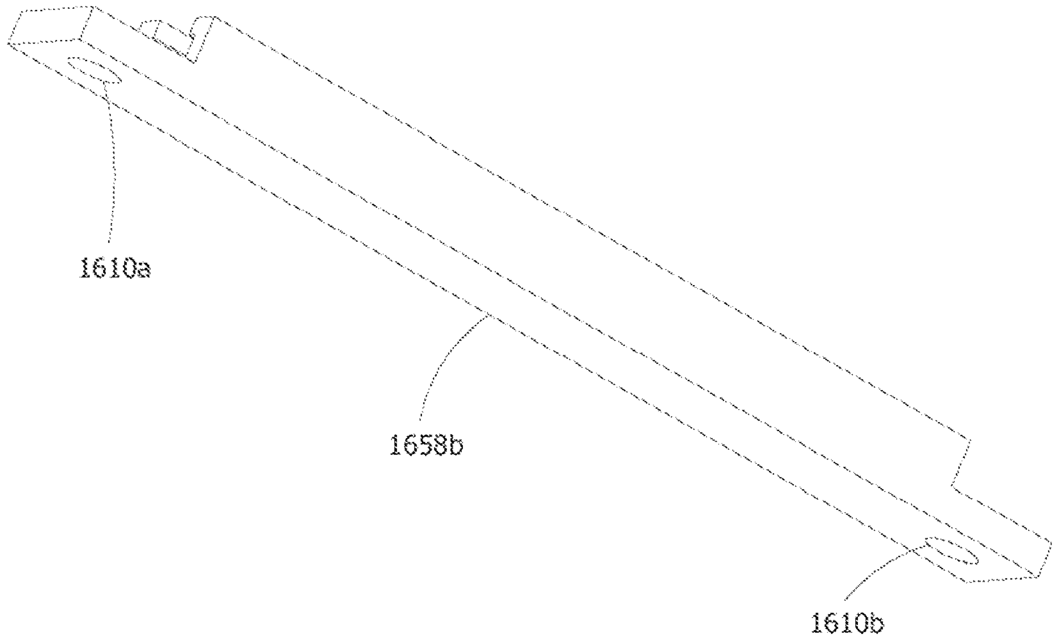
FIG. 18B is an isometric bottom view of an exemplary T-slot base bracket.
Figure 18C:
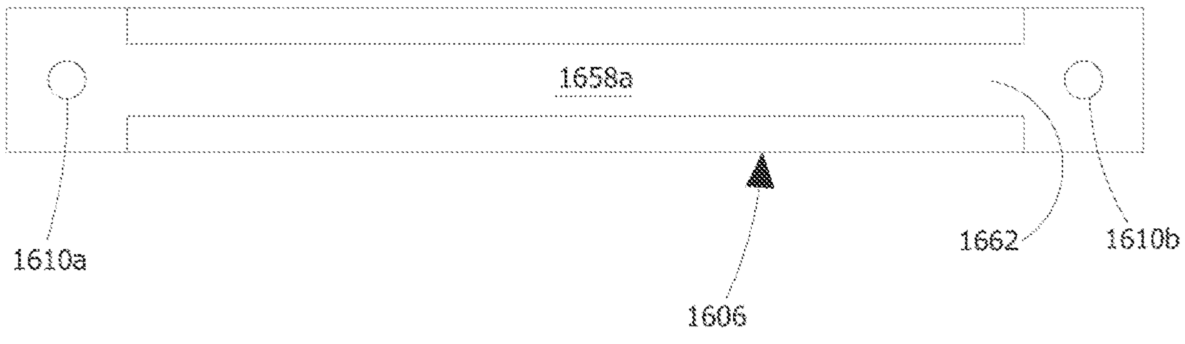
FIG. 18C is a top view of FIG. 18A.
Figure 18D:
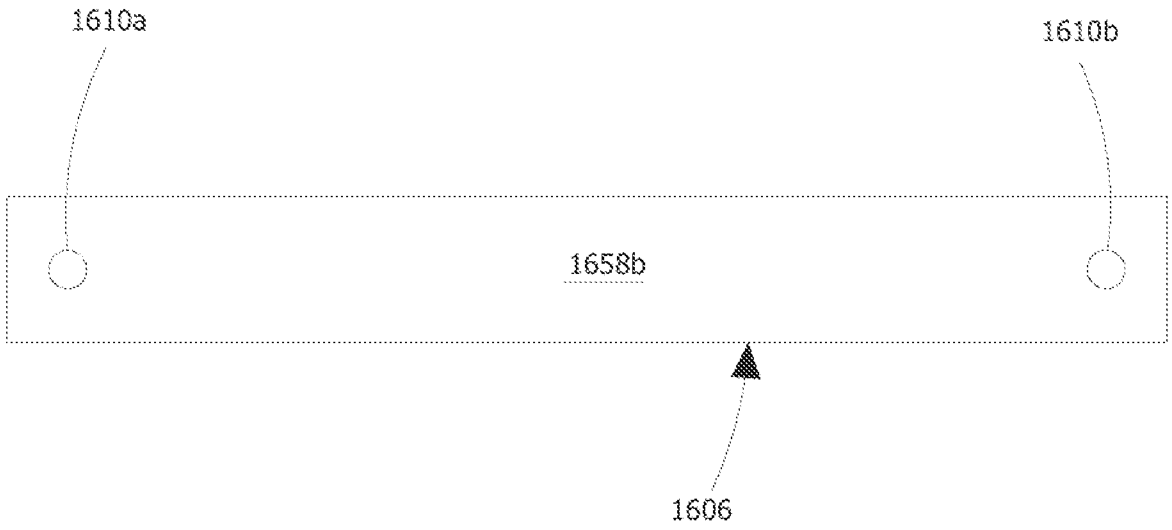
FIG. 18D is a bottom view of FIG. 18B.
Figure 18E:
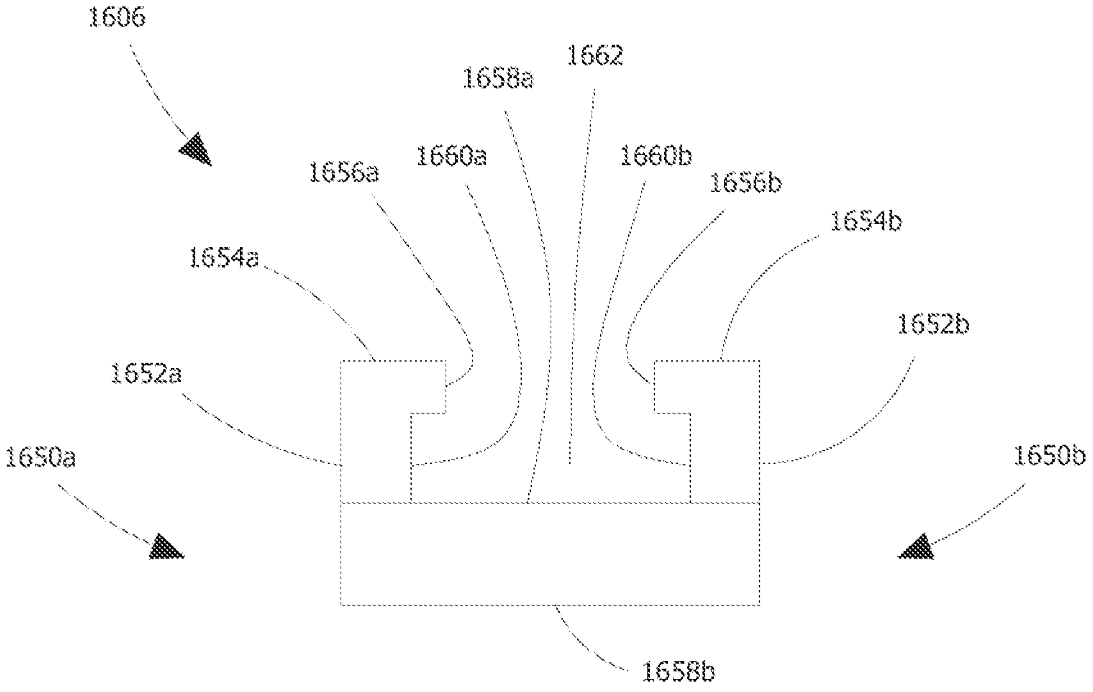
FIG. 18E is an end view of an exemplary T-slot base bracket of FIG. 18A, looking along arrowed line 18 of FIG. 18A.

FIGS. 18A-18E illustrate various views of slotted base bracket 1606. FIG. 18E is an end view of a slotted base bracket 1606 of FIG. 18A, looking along arrowed line 18 of FIG. 18A. The slotted base bracket 1606 may be in the form of an elongate extrusion (for example, of aluminium or another suitable metal) which can be cut to a length suitable for use for a particular opening. In such an embodiment, the slotted base bracket 1606 may be formed as an integrally formed element, but it should be appreciated that variations, such as elongate mounting members which are formed from two or more parts, are within the scope of the present disclosure.

The slotted base bracket 1606 has a first transverse side 1650*a* and a second transverse side 1650*b*, and an inner surface 1658*a* and an outer surface 1658*b*. The first transverse side 1650*a* includes a first wall 1652*a* that projects substantially perpendicularly away from the inner surface 1658*a*. The first wall 1652*a* terminates, along its edge distal from the inner surface 1658*a*, in a first return portion 1654*a* which extends away from first wall 1652*a* substantially towards the second transverse side 1650*b* of the slotted base bracket 1606.

The first wall 1652*a* and first return portion 1654*a* provide the first connection portion 1656*a*, which together define the first connection slot 1660*a*. The first connection slot 1660*a* is thus elongate and bounded in three of its transverse directions (e.g. left, top and bottom as seen in FIG. 18E) by the first wall 1652*a*, the first return portion 1654*a*, and part of the slotted base bracket 1606, while being open along its fourth transverse direction (e.g. right as seen in FIG. 18E) which faces the second transverse side 1650*b* of the slotted base bracket 1606.

Similarly, the second transverse side 1650*b* includes a second wall 1652*b* that projects substantially perpendicularly away from the inner surface 1658*a*. The second wall 1652*b* terminates, along its edge distal from the inner surface 1658*a*, in a second return portion 1654*b* which extends away from second wall 1652*b* substantially towards the first transverse side 1650*a* of the slotted base bracket 1606.

The second wall 1652*b* and second return portion 1654*b* provide the second connection portion 1656*b*, which together define the second connection slot 1660*b*. The second connection slot 1660*b* is thus elongate and bounded in three of its transverse directions (e.g. right, top and bottom as seen in FIG. 18E) by the second wall 1652*b*, the second return portion 1654*b*, and part of the slotted base bracket 1606, while being open along its fourth transverse direction (e.g. left as seen in FIG. 18E) which faces the first transverse side 1650*a* of the slotted base bracket 1606.

Thus, it will be appreciated that in this embodiment, the shapes of the first and second transverse sides 1650*a*, 1650*b*, are similar and generally symmetrical to each other, and spaced apart in the transverse width direction of the slotted base bracket 1606. The respective first and second connection slots 1660*a*, 1660*b* are also similar to each other and spaced apart in the transverse width direction of the slotted base bracket 1606.

Returning to FIG. 17E, the base 1611 includes bottom surface portion 1618 for engaging the inner surface 1658*a* of slotted base bracket 1606 (in FIG. 18E), a first side surface portion 1612*a* for approaching and possibly engaging the first wall 1652*a* (in FIG. 18E), a first return surface 1614*a* for approaching and possibly engaging the first return portion 1654*a* (in FIG. 18E), and first shoulder 1616*a* for approaching and possibly engaging the first connection portion 1656*a*. The base 1611 is dimensioned to fit closely in the first connection slot 1660*a* of FIG. 18E, and is thus in a form having surfaces for cooperation and engagement with corresponding surfaces of slotted base bracket 1606.

Base 1611 also includes a second side surface portion 1612*b* for approaching and possibly engaging the second wall 1652*b* (in FIG. 18E), a second return surface 1614*b* for approaching and possibly engaging the second return portion 1654*b* (in FIG. 18E), and second shoulder 1616*b* for approaching and possibly engaging the second connection portion 1656*b*. Base 1611 is dimensioned to fit closely in the first connection slot 1660*a* and second connection slot

1660*b* of FIG. 18E, and is thus in a form having surfaces for cooperation and engagement with corresponding surfaces of slotted base bracket 1606.

In operation, the T-shaped base 1602 of barrel brackets 1601*a*, 1601*b* is positioned within the cavity 1662 of slotted base bracket 1606, such as shown in FIGS. 16A, 18A, 18C and 18E. As shown generally in FIGS. 11-15, the actuator linkage assembly 1600 is mounted to a desired position of the moveable portion 1101 of window 1106 by tightening screws 1610*a*, 1610*b*, within the screw holes 1608*a*, 1608*b* (of slotted base bracket 1606), to secure the assembly 1600 to the moveable portion 1101. The T-shaped base 1602 slides within the cavity 1662 and is placed in a desired position within the cavity 1662. When the T-shaped base 1602 is placed in a desired position within the cavity 1662, screws 1609*a*, 1609*b* can be tightened within screw holes 1607*a*, 1607*b*.

As shown in FIG. 16H, when screws 1609*a*, 1609*b* are tightened within screw holes 1607*a*, 1607*b*, the T-shaped base 1602 moves toward the first connection portion 1656*a* and second connection portion 1656*b*. Particularly, a force is generated at the interface of the first return surface 1614*a* of the T-shaped base 1602 and the first connection portion 1656*a* of the slotted base bracket 1606, and at the interface of the second return surface 1614*b* of the T-shaped base 1602 and the second connection portion 1656*b* of the slotted base bracket 1606. Generally, as screws 1609*a*, 1609*b* are increasingly tightened, the force holding the T-shaped base 1602 in place correspondingly increases.

What is claimed is:

1. A window actuator linkage assembly for mounting on a moveable portion of a window, comprising:

an elongate mounting member having a first barrel bracket and a second barrel bracket separated from the first barrel bracket by an opening along a length of the elongate mounting member, and a base portion having i) a bottom surface portion, ii) a first side surface portion extending substantially perpendicular from the bottom surface portion, iii) a first return surface extending substantially perpendicular from the first side surface portion, iv) a first shoulder extending substantially perpendicular from the first return surface, v) a second side surface portion extending substantially perpendicular from the bottom surface portion and substantially parallel to the first side surface portion, vi) a second return surface extending substantially perpendicular from the second side surface, and vii) a second shoulder extending substantially perpendicular from the second return surface and substantially parallel to the first shoulder, wherein a width of the bottom surface portion defined by the first and second side surface portions is greater than a width of the first and second barrel brackets; and an elongate base bracket, formed separately from and configured to be secured to the elongate mounting member via a first connection slot and a second connection slot which are open on both ends, said elongate base bracket, having i) an inner surface and an outer surface, ii) a first wall extending substantially perpendicularly from and along a first edge of the inner surface, terminating at a first wall edge distal from the first edge of the inner surface, iii) a second wall projecting substantially perpendicularly from and along a second edge of the inner surface and substantially parallel to the first wall, terminating at a second wall edge distal from the second edge of the inner surface, iv) a first return portion extending from the first wall edge and substantially towards the second wall, and v) a second return portion extending from the second wall edge and substantially towards the first wall, wherein the first side surface portion is configured to be slidably positioned along the first wall and the first return surface is configured to be slidably positioned along the first return portion, and wherein the second side surface portion is configured to be slidably positioned along the second wall and the second return surface is configured to be slidably positioned along the second return portion.

2. The assembly of claim 1, wherein the base portion further comprises at least one hole.

3. The assembly of claim 2, wherein the at least one hole is configured to receive a screw to fasten barrel brackets in a desired position along the length of the elongated base bracket.

4. The assembly of claim 1, wherein the base portion further comprises at least two holes.

5. The assembly of claim 4, wherein the at least two holes are configured to respectively receive a screw to fasten barrel brackets in a desired position along the length of the elongated base bracket.

6. The assembly of claim 1, wherein the elongate base bracket further comprises at least two screw holes.

7. The assembly of claim 6, wherein the at least two screw holes are configured to respectively receive a screw to fasten the elongate base bracket to the moveable portion of the window.

8. The assembly of claim 1, wherein the opening is configured to receive a window chain linkage of an actuator.

9. A window actuator linkage assembly for mounting on a moveable portion of a window, comprising:

an elongate mounting member having a first barrel bracket and a second barrel bracket separated from the first barrel bracket by an opening along a length of the elongate mounting member, and a base portion having a T-shaped base; and an elongate base bracket, formed separately from and configured to be secured to the elongate mounting member, having a first connection slot and a second connection slot, wherein the base portion of said elongate mounting member is configured to be slidably positioned along the first connection slot and the second connection slot of said elongate bracket to thereby adjust the position of said barrel brackets with respect to said elongate base bracket, wherein the first connection slot and second connection slot are open on both ends.

10. The assembly of claim 9, wherein the base portion further comprises at least one hole.

11. The assembly of claim 10, wherein the at least one hole is configured to receive a screw to fasten barrel brackets in a desired position along the length of the elongated base bracket.

12. The assembly of claim 9, wherein the base portion further comprises at least two holes.

13. The assembly of claim 12, wherein the at least two holes are configured to respectively receive a screw to fasten barrel brackets in a desired position along the length of the elongated base bracket.

14. The assembly of claim 9, wherein the elongate base bracket further comprises at least two screw holes.

15. The assembly of claim 14, wherein the at least two screw holes are configured to respectively receive a screw to fasten the elongate base bracket to the moveable portion of the window.

16. The assembly of claim 9, wherein the opening is configured to receive a window chain linkage of an actuator.

* * * * *